US012353327B2

(12) United States Patent
Tsai

(10) Patent No.: US 12,353,327 B2
(45) Date of Patent: Jul. 8, 2025

(54) METHOD FOR PERFORMING GARBAGE COLLECTION MANAGEMENT OF MEMORY DEVICE WITH AID OF BLOCK CLASSIFICATION, MEMORY CONTROLLER, MEMORY DEVICE AND ELECTRONIC DEVICE

(71) Applicant: Silicon Motion, Inc., Hsinchu County (TW)

(72) Inventor: Cheng-Yu Tsai, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/653,915

(22) Filed: May 2, 2024

(65) Prior Publication Data

US 2024/0370367 A1 Nov. 7, 2024

(30) Foreign Application Priority Data

May 3, 2023 (TW) .................................. 112116436

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ..................................................... G06F 12/0253
USPC ............................................................ 707/813
See application file for complete search history.

(56) References Cited

U.S. PATENT DOCUMENTS

| 8,200,889 | B2 | 6/2012 | Kwon | |
|---|---|---|---|---|
| 9,026,716 | B2 | 5/2015 | Kang | |
| 10,402,350 | B2 | 9/2019 | Kanno | |
| 10,838,859 | B2 | 11/2020 | Saxena | |
| 2021/0255783 | A1* | 8/2021 | Ou | ........................ G06F 3/0659 |
| 2022/0237115 | A1* | 7/2022 | Seo | ..................... G06F 12/0253 |
| 2024/0160369 | A1* | 5/2024 | Huang | .................. G06F 3/0616 |

\* cited by examiner

*Primary Examiner* — Syling Yen
(74) *Attorney, Agent, or Firm* — Winston Hsu

(57) ABSTRACT

A method for performing garbage collection (GC) management of a memory device with aid of block classification and associated apparatus are provided. The method may include: utilizing a memory controller to divide at least one portion of blocks among a plurality of blocks into multiple first blocks belonging to at least one first type in a first area and multiple second blocks belonging to at least one second type in a second area; utilizing the memory controller to receive a first command from a host device through a transmission interface circuit within the memory controller; and during writing data in response to the first command, performing a foreground GC procedure to control the memory device to perform GC before completing at least one writing operation corresponding to the first command, for controlling priority of releasing storage space of the second area to be higher than that of the first area.

14 Claims, 10 Drawing Sheets

METHOD FOR PERFORMING GARBAGE COLLECTION MANAGEMENT OF MEMORY DEVICE WITH AID OF BLOCK CLASSIFICATION, MEMORY CONTROLLER, MEMORY DEVICE AND ELECTRONIC DEVICE

BACKGROUND OF THE INVENTION

1. Field of the Invention

The present invention relates to memory control, and more particularly, to a method for performing garbage collection (GC) management of a memory device with aid of block classification and associated apparatus such as a memory controller of the memory device, the memory device and an electronic device comprising the memory device.

2. Description of the Prior Art

According to the related art, a memory device may perform GC to try releasing a portion of storage space for further use, which may reduce overall performance. More particularly, during access in response to a host request, a controller integrated circuit (IC) of the memory device may under certain circumstances spend an excessive amount of time performing internal operations of the memory device. Some suggestions may have been proposed in the related art to try solving this problem, but further problems such as certain side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method for performing GC management of a memory device with aid of block classification and associated apparatus such as a memory controller of the memory device, the memory device and an electronic device comprising the memory device, in order to solve the above-mentioned problems.

At least one embodiment of the present invention provides a method for performing GC management of a memory device with aid of block classification, where the method can be applied to a memory controller of the memory device. The memory device may comprise the memory controller and a non-volatile (NV) memory, the NV memory may comprise at least one NV memory element (e.g., one or more NV memory elements), and the aforementioned at least one NV memory element may comprise a plurality of blocks. The method may comprise: utilizing the memory controller to divide at least one portion of blocks among the plurality of blocks into multiple first blocks belonging to at least one first type in a first area (or region) and multiple second blocks belonging to at least one second type in a second area (or region), wherein a bit count per memory cell of the multiple first blocks is fixed, and a bit count per memory cell of a first set of second blocks among the multiple second blocks, rather than a bit count per memory cell of all second blocks among the multiple second blocks, is fixed; utilizing the memory controller to receive a first command from a host device through a transmission interface circuit within the memory controller, wherein the first command indicates a write request from the host device; and during writing data in response to the first command, performing a foreground GC (FGC) procedure to control the memory device to perform GC before completing at least one writing operation corresponding to the first command, for controlling priority of releasing storage space of the second area to be higher than that of releasing storage space of the first area, wherein the FGC procedure comprises multiple FGC sub-procedures. In addition, a FGC start-up control sub-procedure among the multiple FGC sub-procedures may comprise: determining whether at least one first FGC-related condition among a set of first FGC-related conditions is satisfied (or met); and according to whether the at least one first FGC-related condition is satisfied, determining whether to perform FGC, wherein if the at least one first FGC-related condition is satisfied, it is determined to perform the FGC to allow performing subsequent operations of the FGC procedure, otherwise, it is determined not to perform the FGC to prevent performing said subsequent operations of the FGC procedure.

In addition to the above method, the present invention also provides a memory controller of a memory device, where the memory device may comprise the memory controller and a NV memory. The NV memory may comprise at least one NV memory element (e.g., one or more NV memory elements), and the aforementioned at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform GC management of the memory device with aid of block classification. The memory controller further comprises a transmission interface circuit, and the transmission interface circuit is arranged to perform communications with the host device. For example, the memory controller divides at least one portion of blocks among the plurality of blocks into multiple first blocks belonging to at least one first type in a first area and multiple second blocks belonging to at least one second type in a second area, wherein a bit count per memory cell of the multiple first blocks is fixed, and a bit count per memory cell of a first set of second blocks among the multiple second blocks, rather than a bit count per memory cell of all second blocks among the multiple second blocks, is fixed; the memory controller receives a first command from the host device through the transmission interface circuit within the memory controller, wherein the first command indicates a write request from the host device; and during writing data in response to the first command, the memory controller performs a foreground GC (FGC) procedure to control the memory device to perform GC before completing at least one writing operation corresponding to the first command, for controlling priority of releasing storage space of the second area to be higher than that of releasing storage space of the first area, wherein the FGC procedure comprises multiple FGC sub-procedures. Additionally, a FGC start-up control sub-procedure among the multiple FGC sub-procedures may comprise: determining whether at least one first FGC-related condition among a set of first FGC-related conditions is satisfied; and according to whether the at least one first FGC-related condition is satisfied, determining whether to perform FGC, wherein if the at least one first FGC-related condition is satisfied, it is determined to perform the FGC to allow performing subsequent operations of the FGC procedure, otherwise, it is determined not to perform the FGC to prevent performing said subsequent operations of the FGC procedure.

In addition to the method mentioned above, the present invention also provides the memory device comprising the memory controller mentioned above, wherein the memory device comprises the NV memory and the memory controller. The NV memory is configured to store information, and the memory controller is coupled to the NV memory, and is configured to control operations of the memory device.

In addition to the method mentioned above, the present invention also provides an electronic device. The electronic device may comprise the memory device mentioned above, and may further comprise the host device that is coupled to the memory device. The host device may comprise at least one processor that is arranged for controlling operations of the host device; and a power supply circuit that is coupled to the at least one processor, and is arranged for providing power to the at least one processor and the memory device. In addition, the memory device may provide the host device with storage space.

According to some embodiments, the apparatus may comprise at least one portion (e.g., a portion or all) of the electronic device. For example, the apparatus may comprise the memory controller within the memory device. For another example, the apparatus may comprise the memory device. For yet another example, the apparatus may comprise the host device. In some examples, the apparatus may comprise the electronic device.

According to some embodiments, the memory controller of the memory device may control the operations of the memory device according to the method, and the memory device may be installed in the electronic device. In addition, the memory device may store data for the host device. The memory device may read the stored data in response to a host command from the host device, and provide the host device with the data read from the NV memory.

The present invention method and apparatus can guarantee that the memory device can operate properly in various situations, and more particularly, divide all blocks among the plurality of blocks of the NV memory into blocks respectively corresponding to multiple types, and when performing GC operations, refer to different trigger conditions to use blocks corresponding to a certain type together as source blocks, and determine target blocks to be destination blocks, to make the GC operations of each time conform to the requirement corresponding to a certain trigger condition, in order to enhance overall GC performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
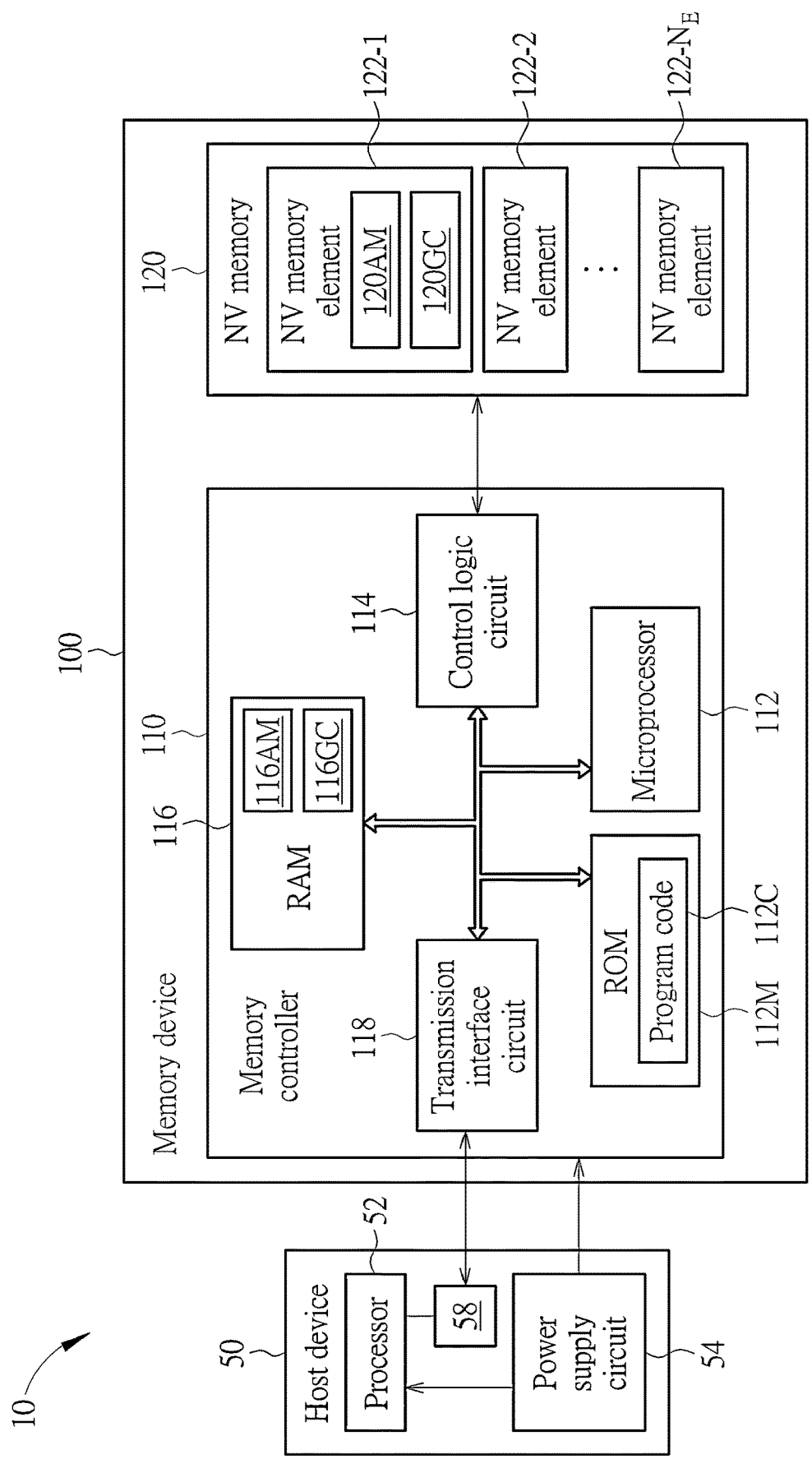
FIG. 1 is a diagram of an electronic device according to an embodiment of the present invention.

FIG. 1 is a diagram of an electronic device according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-$N_E$, where "$N_E$" may represent a positive integer that is greater than one. For example, the NV memory 120 may be a flash memory, and the plurality of NV memory elements 122-1, 122-2, . . . , and 122-$N_E$ may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, Non-Volatile Memory Express (NVMe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specifications for the host device 50.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses, where the NV memory 120 may store a global L2P address mapping table 120AM, for the memory controller 110 to control the memory device 100 to access data in the NV memory 120, but the present invention is not limited thereto. In addition, the memory controller 110 may generate or update at least one GC management table such as a GC management table 120GC, and the NV memory 120 may store the GC management table 120GC. The memory controller 110 may generate or update GC-management-related information in the GC management table 120GC for managing GC operations.

For better comprehension, the global L2P address mapping table 120AM and the GC management table 120GC may be located in a predetermined region within the NV memory element 122-1, such as a system region, but the present invention is not limited thereto. For example, the global L2P address mapping table 120AM may be divided into a plurality of local L2P address mapping tables, and the local L2P address mapping tables may be stored in one or more of the NV memory elements 122-1, 122-2, . . . , and 122-$N_E$, and more particularly, may be stored in the NV memory elements 122-1, 122-2, . . . , and 122-$N_E$, respectively. When there is a needed, the memory controller 110 may load at least one portion (e.g., a portion or all) of the global L2P address mapping table 120AM into the RAM 116 or other memories. For example, the memory controller 110 may load a local L2P address mapping table among the plurality of local L2P address mapping tables into the RAM 116 to be a temporary L2P address mapping table 116AM, for accessing data in the NV memory 120 according to the local L2P address mapping table which is stored as the temporary L2P address mapping table 116AM, but the present invention is not limited thereto. The memory controller 110 may generate or update address mapping information in the temporary L2P address mapping table 116AM, and update the global L2P address mapping table 120AM according to the latest address mapping information in the temporary L2P address mapping table 116AM. In addition, the memory controller 110 may load the GC management table 120GC into the RAM 116 or other memories. For example, the memory controller 110 may load the GC management table 120GC into the RAM 116 to be a temporary GC management table 116GC, in order to manage GC operations according to the temporary GC management table 116GC. The memory controller 110 may generate or update GC-management-related information in the GC management table 116GC, and update the GC management table 120GC according to the latest GC-management-related information in the GC management table 116GC.

In addition, the aforementioned at least one NV memory element (e.g., the one or more NV memory elements such as {122-1, 122-2, . . . , 122-$N_E$}) may comprise a plurality of blocks {BLK}, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, $N_E$]) within the NV memory elements 122-1, 122-2, . . . , and 122-$N_E$, may comprise multiple blocks, and a block within the multiple blocks may comprise and record a specific number of pages, where the memory controller 110 may access a certain page of a certain block within the multiple blocks according to a block address and a page address.

According to some embodiments, the memory controller 110 may configure any block BLK among the plurality of blocks {BLK} to be a single level cell (SLC) block for performing storage of 1 (one) bit per memory cell, but the present invention is not limited thereto. The memory controller 110 may configure the aforementioned any block BLK into an X-level cell (XLC) block for performing storage of X bits per memory cell, where X can be a positive integer. For example, when X=1, the XLC block may represent the SLC block. In some examples, when X>1, the XLC block may represent any of a multiple level cell (MLC) block (e.g., a double level cell (DLC) block), a triple level cell (TLC) block, a quadruple level cell (QLC) block, etc.

In addition, the memory controller 110 may calculate the number of pages with valid data in the above-mentioned any block BLK to be the valid page count VPC of the above-mentioned any blocks BLK, and select blocks {BLK} with smaller valid page counts {VPC} as GC source blocks for performing at least one GC operation, in order to maximize the number of blocks {BLK} released by the aforementioned at least one GC operation, but the invention is not limited thereto. According to some embodiments, the memory controller 110 may perform block-classification-based GC operations to enhance overall performance, and more particularly, divide at least one portion of blocks {BLK} among the plurality of blocks {BLK} into multiple first blocks belonging to at least a first type in a first area (or first region) and multiple second blocks belonging to at least a second type in a second area (or second region), for being used in operations corresponding to multiple purposes, and in response to any predetermined condition among multiple predetermined conditions being satisfied, perform GC source block selection (for example, the operation of selecting blocks belonging to at least one type in at least one area/region of the first area/region and the second area/region) and GC mode selection (for example, the operation of selecting a GC mode corresponding to the aforementioned any predetermined condition among multiple GC modes) to perform the corresponding GC operation. For example, the bit count per memory cell (or "the per-memory-cell bit count") of the multiple first blocks is fixed, and the bit count per memory cell of a first set of second blocks among the multiple second blocks, rather than the bit count per memory cell of all second blocks among the multiple second blocks, is fixed. According to some embodiments, the NV memory 120 may be implemented by way of three-dimensional (3D) NAND flash technology, and the first area/region and the second area/region may represent a first 3D space and a second 3D space, rather than being limited to a two-dimensional (2D) concept.

Figure 2:
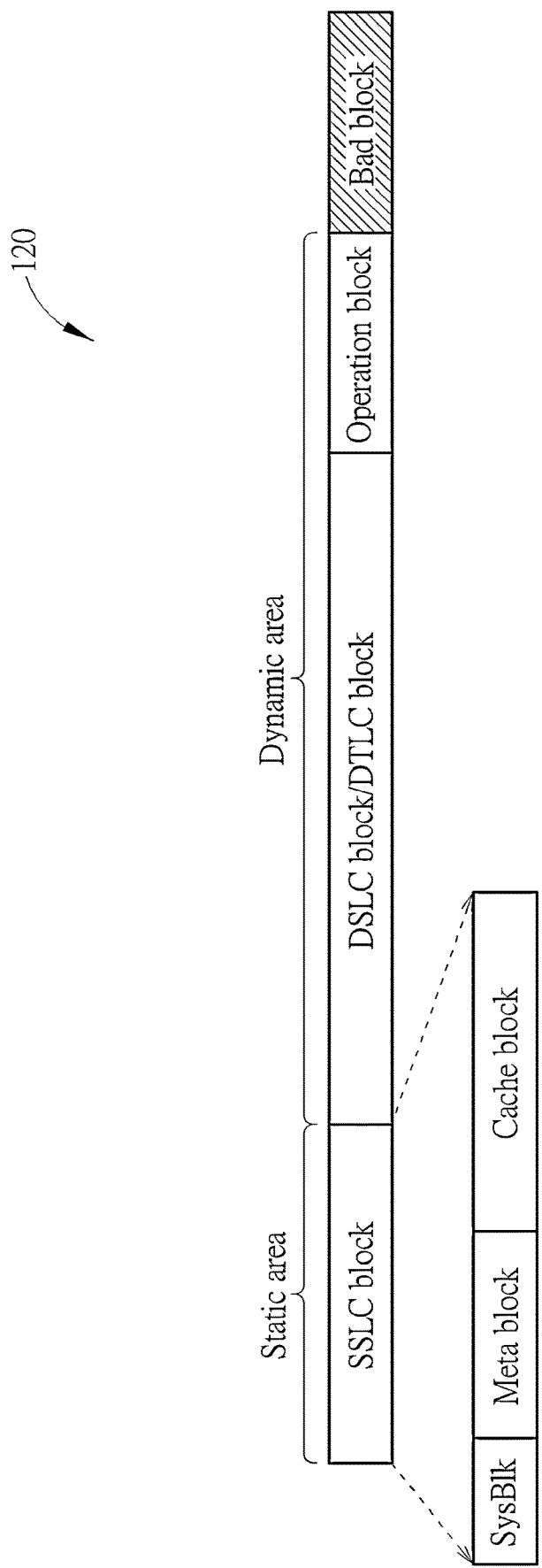
FIG. 2 illustrates a block classification control scheme.

FIG. 2 illustrates a block classification control scheme, where the static area (or "the static region") and the dynamic area (or "the dynamic region") shown in FIG. 2 may be taken as examples of the first area (or "the first region") and the second area (or "the second region"), respectively. The memory controller 110 may perform configurations corresponding to multiple types on the aforementioned at least one portion of blocks {BLK} among the plurality of blocks {BLK}, to divide them into blocks respectively corresponding to the multiple types, and the blocks respectively corresponding to the multiple types may comprise:

(1) the SLC blocks in the static area, which may be collectively referred to as the static SLC (SSLC) blocks, and may belong to an SSLC type, wherein, when an SSLC block is used as a cache block for caching data, the SSLC block may be referred to as an SSLC cache block;

(2) the SLC blocks in the dynamic area, which may be collectively referred to as the dynamic SLC (DSLC) blocks, and may belong to a DSLC type; and (3) the TLC blocks in the dynamic area, which may be collectively referred to as the dynamic TLC (DTLC) blocks, and may belong to a DTLC type;

where the above-mentioned at least one first type may comprise the SSLC type, and the above-mentioned at least one second type may comprise the DSLC type and the DTLC type, but the invention is not limited thereto. According to some embodiments, the above-mentioned DTLC blocks may be replaced by XLC blocks in the dynamic area, and the XLC blocks in the dynamic area may be collectively referred to as the dynamic XLC (DXLC) blocks, and may belong to a DXLC type. For example, when X>1, the above-mentioned DXLC blocks may represent any of dynamic MLC (DMLC) blocks such as a dynamic DLC (DDLC) blocks, the above-mentioned DTLC blocks, dynamic QLC (DQLC) blocks, etc. More particularly, the DDLC blocks, the DTLC blocks, the DQLC blocks, etc. may respectively correspond to the cases such as X=2, X=3, X=4, etc. In addition, the dynamic area may comprise operation blocks for GC operations. Assuming that any bad block exists, the memory controller 110 may prevent configuring the aforementioned any bad block in any area among the dynamic area and the static area. Additionally, the SSLC blocks in the static area may comprise system blocks (labeled "SysBlk" for brevity), meta blocks, and cache blocks such as SSLC cache blocks. In the following embodiments, the system blocks and meta blocks shown in FIG. 2 may be temporarily ignored to focus on the associated descriptions of GC operations, as if only the SSLC blocks such as the SSLC cache blocks are illustrated in the static area.

In the following, the above-mentioned DTLC blocks may be used as an example of the above-mentioned DXLC blocks for better comprehension, but the present invention is not limited thereto. The memory controller 110 may change the bit count per memory cell of the blocks in the dynamic area by reconfiguration, and may maintain the bit count per memory cell of the blocks in the static area to be equal to 1, rather than changing the bit count per memory cell thereof by reconfiguration. For example, during performing GC, the memory controller 110 may reconfigure any DSLC block in the dynamic area as a DTLC block, and may reconfigure any DTLC block in the dynamic area as a DSLC block, but will not reconfigure any SSLC block in the static area as a TLC block. In addition, the memory controller 110 may, in response to a predetermined trigger condition among multiple predetermined trigger conditions being satisfied, select multiple blocks (e.g., the block corresponding to a certain type) associated with the predetermined trigger condition to be source blocks of at least one GC operation, and determine at least one target block as at least one destination block of the above-mentioned at least one GC operation, to make any GC operation among all GC operations meets the requirements corresponding to a certain trigger condition, in order to enhance the overall GC performance.

The memory controller 110 may use the SSLC blocks to perform data reception to optimize the write performance of the memory device 100, and more particularly, preferentially use the SSLC blocks to receive data from the host device 50 during writing operations. For example, the program/erase cycle count (or "the P/E cycle count") of the SLC block may be much greater than the P/E cycle count of the TLC block, so using the SSLC blocks to receive the data may make the memory device 100 durable. In addition, the busy time of program Tprog of the SLC block may be much lower than the busy time of program Tprog of the TLC block, so using the SSLC blocks to receive the data may increase the overall writing speed of the memory device 100. Therefore, the memory controller 110 may use the static area to maximize the overall performance of the memory device 100. Additionally, the memory controller 110 may rewrite the SSLC blocks in the static area many times, where the number of times the SSLC blocks may be rewritten is much higher than that of the reconfigurable DSLC/DTLC blocks in the dynamic area.

If any DSLC block in the dynamic area has been reconfigured as a DTLC block, the storage capacity of all DTLC blocks in the dynamic area may be considered as the storage capacity that the memory device 100 may provide to the host device 50 for storing data, but the invention is not limited thereto. During the writing process, the memory controller 110 may configure multiple DSLC blocks in the dynamic area and allow the number of the multiple DSLC blocks to reach a predetermined maximum DSLC block count in order to try achieving high-speed writing and high stability.

Based on the above block classification (e.g., the block classification shown in FIG. 2), during performing FGC or BGC, the memory controller 110 may properly perform the above-mentioned GC source block selection and the above-mentioned GC mode selection to perform the corresponding GC operations to achieve optimized performance. For example, the above-mentioned FGC may represent the GC performed when the memory device 100 is performing writing according to a write request from the host device 50, and the above-mentioned BGC may represent the GC performed when the memory device 100 is in an idle state (rather than performing operations such as data access operations in response to any request from the host device 50).

For better comprehension, assume that the memory device 100 may perform certain GC-related operations according to a region-and-block-types-unaware control scheme, for example:
(1) during the continuously writing data, when the storage space of the memory device 100 is close to being used up, the memory device 100 may select the blocks {BLK} with smaller valid page counts {VPC} to be the GC source blocks for performing FGC, where there is a high probability that the memory device 100 will select multiple SSLC blocks in the static area as the GC source blocks, release the storage space of the SSLC blocks, and consume one DTLC block to be the target/destination block, which results in reducing the storage space corresponding to this DTLC block in the dynamic area, rather than releasing the storage space corresponding to any block in the dynamic area, thus causing the problem that the storage space will be used up to get worse; and
(2) in a situation where the host device 50 is not writing data into the memory device 100, the memory device 100 may select the blocks {BLK} with smaller valid page counts {VPC} to be the GC source blocks for performing BGC, wherein if the respective valid page counts {VPC} of multiple DTLC blocks in the dynamic region are less than the valid page counts {VPC} of any SSLC blocks in the static region, the memory device 100 will select the multiple DTLC blocks to be the GC source blocks, which causes the memory device 100 to first clean up the storage space corresponding to the multiple DTLC blocks in the dynamic area, rather than releasing storage space corresponding to any block in the static area, thus wasting the idle time that could rarely be got for performing GC on the static area, thereby reducing the overall performance;

but the present invention is not limited thereto. According to one or more other control schemes, the memory controller 110 may prevent improper GC-related operations such as the above-listed GC-related operations based on the region-and-block-types-unaware control schemes, and more particularly, may perform FGC on the dynamic area (rather than the static area) when the storage space of the memory device 100 is close to being used up, and perform BGC on the static area as soon as possible when it is idle in order to increase the number of the spare blocks (e.g., blank blocks) in the static area blocks to maintain the high-speed writing capability of the memory device 100, thereby enhancing the overall performance.

TABLE 1

| GC mode | Source block | Destination block |
| --- | --- | --- |
| S2S mode | SLC block | SLC block |
| S2T mode | SLC block | TLC block |
| T2T mode | TLC block | TLC block |

Table 1 illustrates an example of the multiple GC modes, where the multiple GC modes may comprise an SLC to SLC (S2S) mode, an SLC to TLC (S2T) mode, and a TLC to TLC (T2T) mode, and the fields "Source block" and "Destination block" in Table 1 may represent the above-mentioned source blocks and the above-mentioned at least one destination block of the aforementioned at least one GC operation, respectively. The memory controller 110 may perform a GC operation corresponding to any GC mode (e.g., any of the multiple GC modes) when performing FGC or BGC. As a result, the memory controller 110 may perform at least six combinations of GC operations, such as the FGC operation in the S2S mode, the FGC operation in the S2T mode, the FGC operation in the T2T mode, the BGC operation in the S2S mode, the BGC operation in the S2T mode and the BGC operation in the T2T mode (respectively referred to as "S2S-FGC operation", "S2T-FGC operation", "T2T-FGC operation", "S2S-BGC operation", "S2T-BGC operation" and "T2T-BGC operation" for brevity).

Based on the above block classification (e.g., the block classification shown in FIG. 2), the memory controller 110 may adjust the intensity (or magnitude) of FGC, such as the weights {W_S2S, W_S2T, W_T2T} of the S2S-FGC operation, the S2T-FGC operation and the T2T-FGC operation occupying the foreground operation time, respectively. For example, when the memory controller 110 is writing the SLC block, the memory controller 110 may configure the respective weights W_S2T and W_T2T of the S2T-FGC operation and the T2T-FGC operation as follows:

$$W\_S2T = ((1/2) * W0); \text{ and}$$

$$W\_T2T = (1 * W0);$$

where W0 may represent a predetermined value (e.g., W0=1), but the present invention is not limited thereto. For better comprehension, the above-mentioned any block BLK may be fully written/programmed and the data in the respective pages within this block BLK may be valid data, and therefore, the valid page count VPC of this block BLK may reach its maximum value, referred to as the maximum valid page count Full_VPC. If this block BLK has been configured as an SLC block, the maximum valid page count Full_VPC may be written as the maximum valid page count Full_SLC_VPC. If this block BLK has been configured as a TLC block, the maximum valid page count Full_VPC may be written as the maximum valid page count Full_TLC_VPC. As the maximum valid page count Full_TLC_VPC of one TLC block (e.g., a DTLC block) may be three times the maximum valid page count Full_SLC_VPC of one SLC block (e.g., a DSLC block), it may be expected that an S2T-GC operation may at least release two blocks. When the valid page count ratio RATIO_TLC_VPC of each TLC block among two TLC blocks (e.g., two DTLC blocks), such as the ratio (TLC_VPC/Full_TLC_VPC) of the valid page count TLC_VPC thereof to the maximum valid page count Full_TLC_VPC, is equal to 50%, it may be expected that a T2T-GC operation using these two TLC blocks as the source blocks may release one block. Therefore, the memory controller 110 may configure the weight W_T2T to be two times the weight W_S2T by default, and increase the weight W_T2T in response to the situation(s) where the valid page count ratios {RATIO_TLC_VPC} are greater than 50% to maintain sufficient FGC intensity/magnitude, to make the number of spare blocks (e.g., empty blocks) in the dynamic area be stable.

According to some embodiments, the memory controller 110 may determine whether to execute FGC when processing a host command such as a write command, and may determine whether to execute BGC when in an idle state, and the conditions for starting FGC and the conditions for starting BGC may be independent of each other. When determining to start executing a GC operation (e.g., an FGC operation or a BGC operation), the memory controller 110 may determine which type of blocks to use as the source blocks according to the numbers of various types of blocks at this moment (or the current time point), and may temporarily determine a destination block of this GC operation to be a TLC block. Afterwards, the memory controller 110 may select at most Max_GC_source_cnt blocks among this type of blocks as the source blocks, where the predetermined GC source blocks maximum number Max_GC_source_cnt may represent the maximum number of source blocks of a GC operation. For example, Max_GC_source_cnt=16. If it is detected that the summation (VPC(1)+ . . . + VPC(Max_GC_source_cnt)) of the respective valid page count {VPC(1), . . . , VPC(Max_GC_source_cnt)} of the Max_GC_source_cnt blocks is less than the maximum valid page count Full_SLC_VPC of one SLC block, then the memory controller 110 may determine the destination block of this GC operation to be an SLC block, in order to maintain the valid page count ratio RATIO_VPC of the destination block (such as the ratio (VPC/Full_VPC) of the valid page count VPC thereof to the maximum valid page count Full_VPC) reaching a predetermined valid page count ratio RATIO_VPC0 after the completion of this GC operation, and more particularly, prevent the valid page count ratio RATIO_VPC from being too low (for example, RATIO_TLC_VPC<1/3, for TLC blocks). For example, when the destination block is the SLC block, the valid page count ratio RATIO_VPC may be written as the valid page count ratio RATIO_SLC_VPC (e.g., the ratio (SLC_VPC/Full_SLC_VPC) of the valid page count SLC_VPC to the maximum valid page count Full_SLC_VPC). In addition, the selection of the multiple GC modes may be regarded as the selection of GC types (e.g., the S2S type, the S2T type and the T2T type), and the above-mentioned S2S-FGC/BGC operations, S2T-FGC/BGC operations and T2T-FGC/BGC operations may belong to the S2S type, the S2T type and the T2T type, respectively. The parameters used by the memory controller 110 to determine the GC type may comprise:

(1) the closed SLC block count Closed_SLC, which may represent the number of the closed SLC blocks (e.g., the fully written/programmed SLC blocks) in the aforementioned at least one portion of blocks {BLK} among the plurality of blocks {BLK};

(2) the closed SLC block valid page count Closed_SLC_VPC, which may represent the summation of the respective valid page counts {VPC} of the closed SLC blocks (e.g., the fully written/programmed SLC blocks) in the aforementioned at least one portion of blocks {BLK} among the plurality of blocks {BLK};

(3) the closed TLC block count Closed_TLC, which may represent the number of the closed TLC blocks (e.g., the fully written/programmed TLC blocks), where the closed TLC block count Closed_TLC may be regarded as the closed DTLC block count Closed_DTLC, which may represent the number of the closed DTLC blocks (e.g., the fully written/programmed DTLC blocks) in the dynamic area;

(4) the dynamic area spare block count dySpr, which may represent the number of the spare blocks (e.g., the blocks that have not been used) in the dynamic area; and (5) the high priority block count H_pri_cnt, which may represent the number of the high priority blocks, for indicating whether there are one or more high priority blocks such as blocks with high priority, where the high priority blocks may comprise blocks in which read disturbance occurs or blocks needing to be processed with wear-leveling, and the memory controller 110 may monitor the number of high priority blocks to generate or update the high priority block count H_pri_cnt; where the above-mentioned GC-management-related information in the GC management table 120GC and/or the GC management table 116GC may comprise the above parameters, but the present invention is not limited thereto. For example, according to the closed SLC block count Closed_SLC, the closed SLC block valid page count Closed_SLC_VPC and the closed TLC block count Closed_TLC, the memory controller 110 may determine the GC type of the GC operation to be performed in the BGC. For another example, the memory controller 110 may determine whether to perform FGC according to the dynamic area spare block count dySpr, and more particularly, based on the closed SLC block valid page count Closed_SLC_VPC, determine the GC type of the GC operation to be performed in FGC. In some examples, the memory controller 110 may determine the associated operations of the BGC or FGC according to the high priority block count H_pri_cnt, wherein, when the above-mentioned high priority blocks appear, the memory controller 110 may preferentially process them, and more particularly, select them as the source blocks of the current GC operation.

Figure 3A:
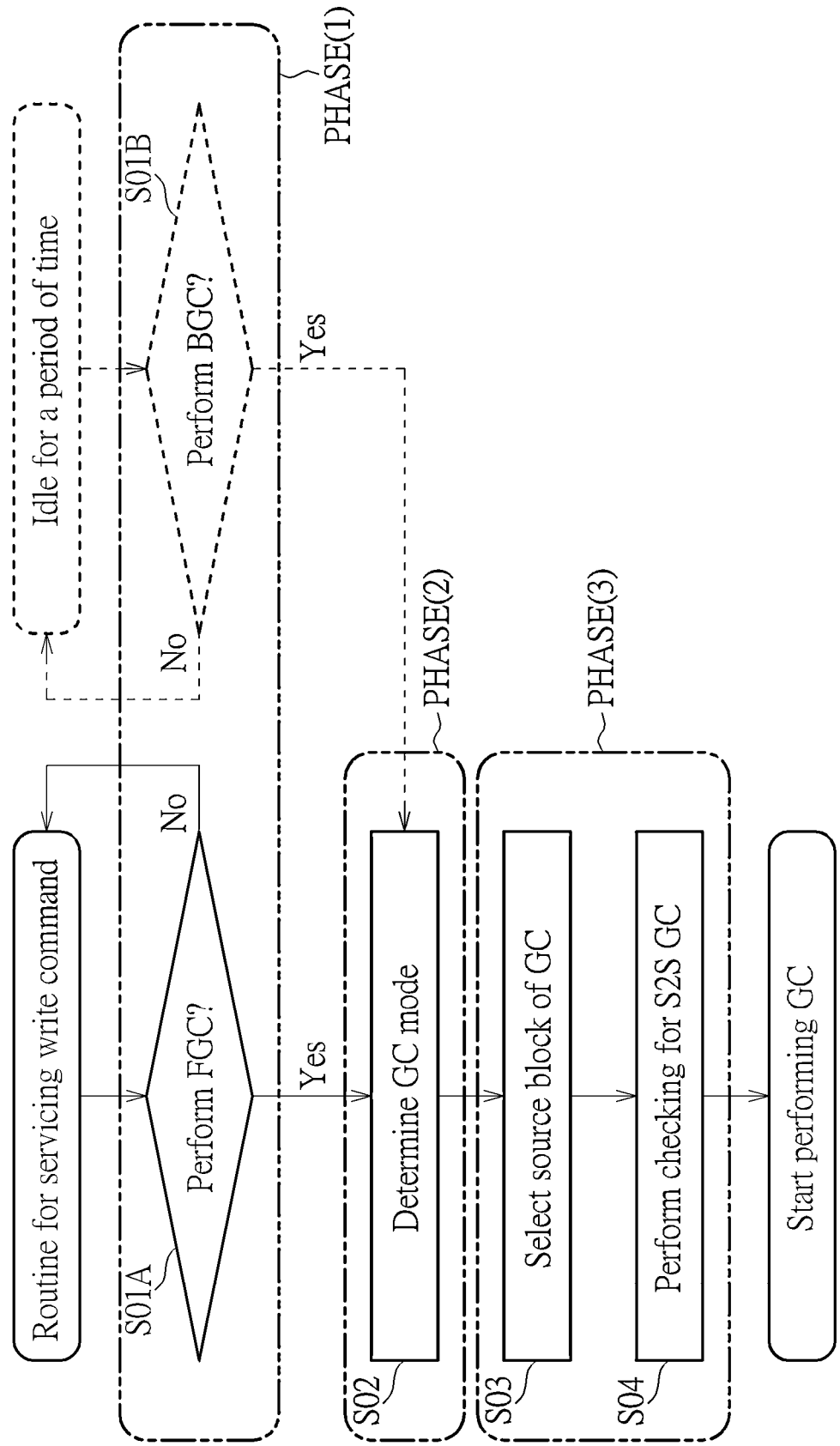
FIG. 3A illustrates a foreground GC (FGC) procedure of a foreground and background GC control scheme of a method for performing GC management of a memory device with aid of block classification according to an embodiment of the present invention.
Figure 3B:
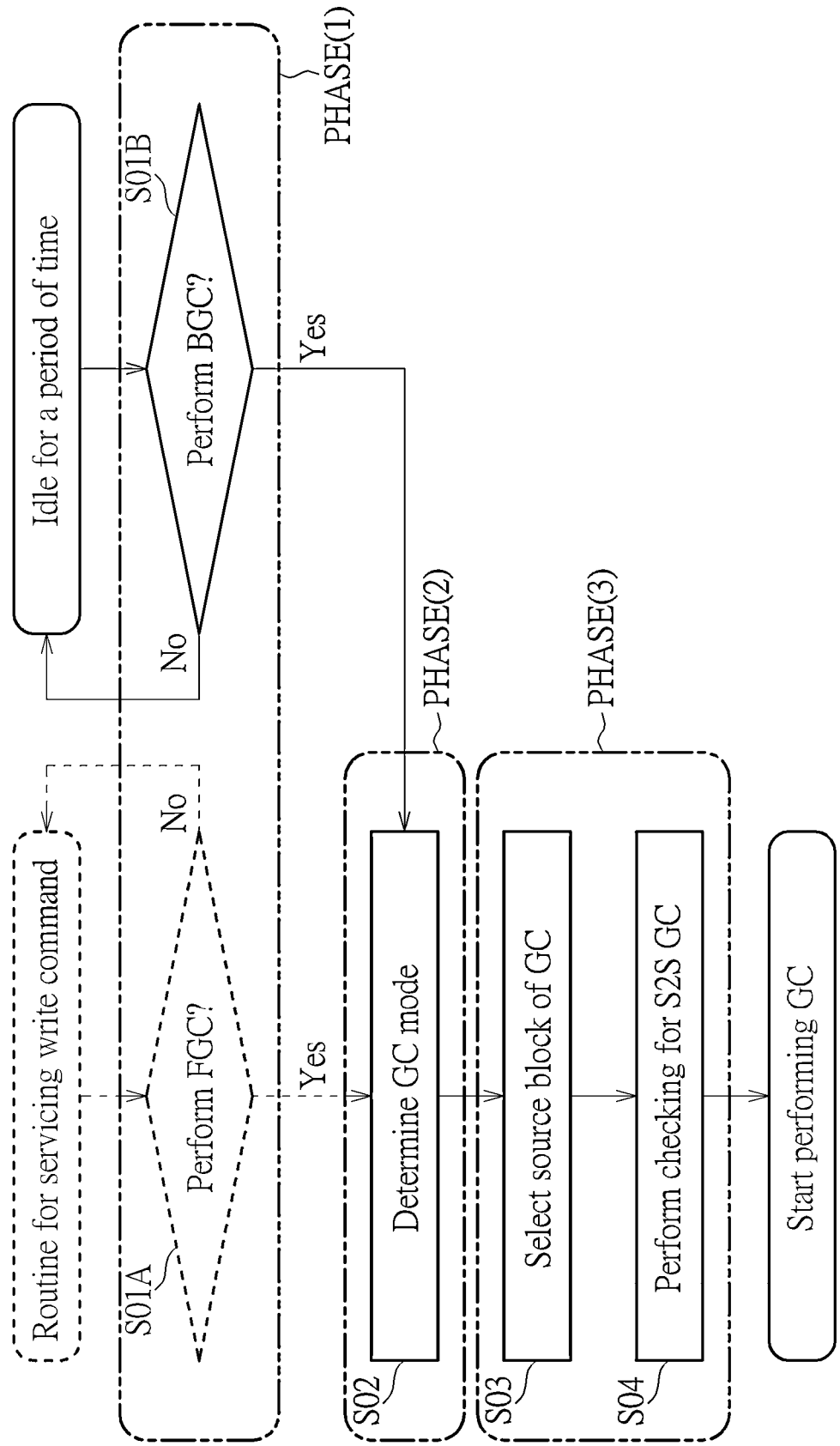
FIG. 3B illustrates a background GC (BGC) procedure of the foreground and background GC control scheme.

FIG. 3A and FIG. 3B illustrate a FGC procedure and a BGC procedure of a foreground and background GC control scheme of a method for performing GC management of a memory device with aid of block classification according to an embodiment of the present invention, respectively, where Steps S01A and S01B, Step S02, and Steps S03 and S04 may be executed in a first phase, a second phase, and a third phase (e.g., the phases PHASE(1) to PHASE(3)) respectively. For example, the memory controller 110 may receive at least one first command from the host device 50 through the transmission interface circuit 118, and the aforementioned at least one first command may indicate at least one write request from the host device 50. The memory controller 110 may perform data writing in response to the aforementioned at least one first command, which may cause the available storage space to be reduced. Assume that the NV memory 120 has stored a large amount of data. Before completing at least one writing operation corresponding to any first command among the aforementioned at least one first command, the memory controller 110 may detect that the available storage space is too low or is about to become insufficient. The memory controller 110 may perform the FGC procedure to control the memory device 100 to perform GC before completing the aforementioned at least one writing operation corresponding to the aforementioned any first command, to preferentially release the storage space of the second area (e.g., the dynamic area), rather than the storage space of the first area (e.g., the static area), but the invention is not limited thereto.

As shown in FIG. 3A, the partial working flow depicted with solid lines may correspond to the FGC, while the partial working flow depicted with dashed lines may be temporarily ignored. The memory controller 110 may execute a routine for servicing the write command to write data into the NV memory 120 in response to the write command from the host device 50, and in Step S01A determine whether to perform the FGC at least according to whether at least one portion of conditions among a set of first FGC-related conditions corresponding to the FGC are satisfied. If Yes, Step S02 is entered; if No, the memory controller 110 may still execute the routine. When determining to perform the FGC, in Step S02, the memory controller 110 may determine a GC mode according to whether at least one portion of conditions among a set of second FGC-related conditions corresponding to the FGC are satisfied.

As shown in FIG. 3B, the partial working flow depicted with solid lines may correspond to the BGC, while the partial working flow depicted with dashed lines may be temporarily ignored. The memory controller 110 may be idle for a period of time, and in Step S01B, determine whether to perform the BGC at least according to whether at least one portion of conditions among a set of first BGC-related conditions corresponding to the BGC are satisfied. If Yes, Step S02 is entered; if No, the memory controller 110 may still be in the idle state. When determining to perform the BGC, in Step S02, the memory controller 110 may determine a GC mode according to whether at least one portion of conditions among a set of second BGC-related conditions corresponding to the BGC are satisfied.

As shown in any figure among FIG. 3A and FIG. 3B, the memory controller 110 may select the source block(s) of the GC according to the GC mode in Step S03, and selectively perform checking for the S2S GC in Step S04. For example, when there is a need, the memory controller 110 may switch from the S2T mode to the S2S mode in Step S03. Afterwards, the memory controller 110 may start performing the GC.

For better comprehension, the method may be illustrated with the working flow shown in FIG. 3A and FIG. 3B, but the present invention is not limited thereto. According to some embodiments, one or more steps may be added, deleted, or changed in the working flow shown in FIG. 3A and FIG. 3B. For example, the FGC procedure shown in FIG. 3A may comprise multiple FGC sub-procedures (e.g., the working flows shown in FIG. 4A and FIG. 5A and the associated partial working flows in the working flow shown in FIG. 6), and the BGC procedure shown in FIG. 3B may comprise multiple BGC sub-procedures (e.g., the working flows shown in FIG. 4B and FIG. 5B and the associated partial working flows in the working flow shown in FIG. 6).

Figure 4A:
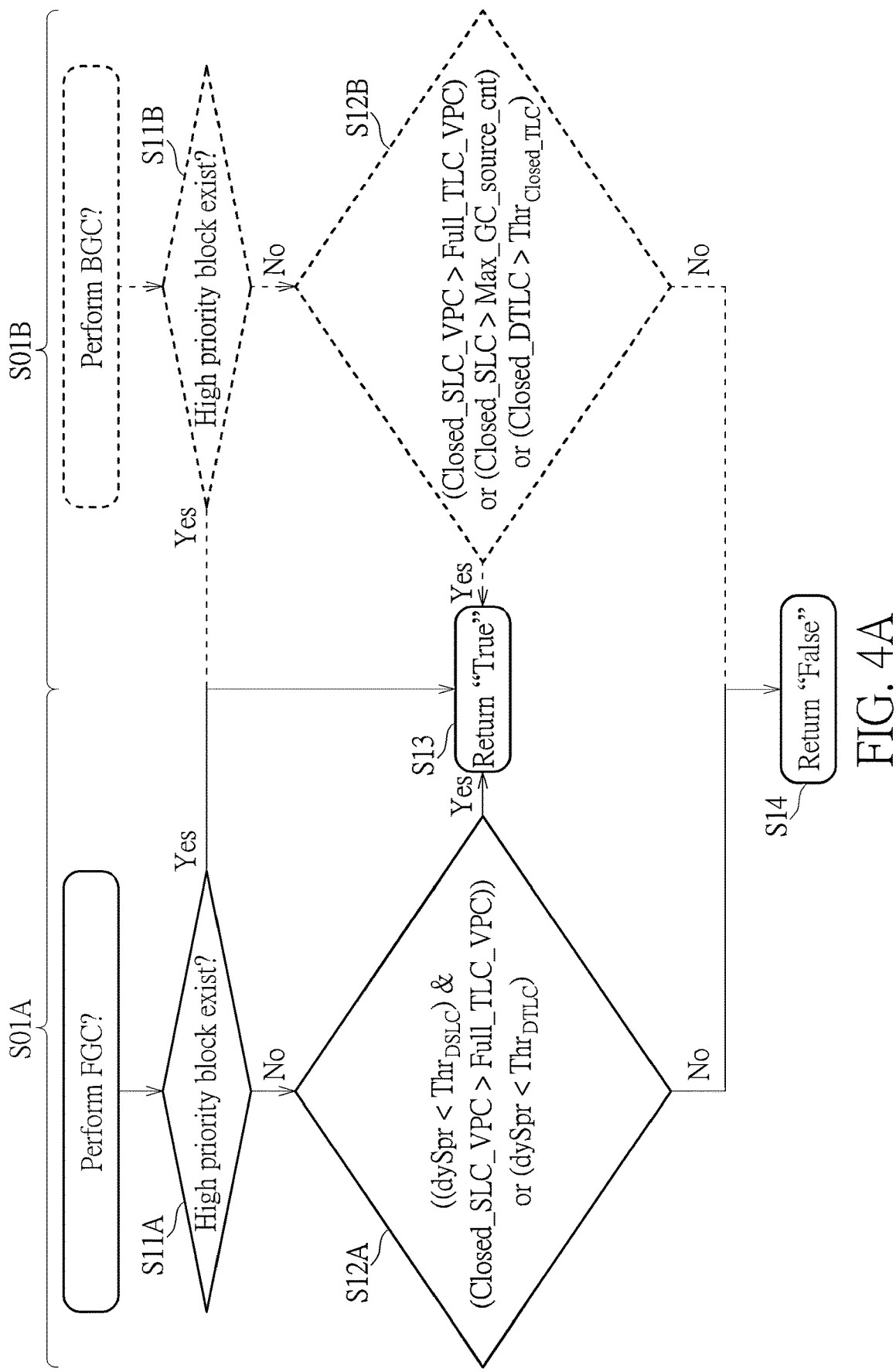
FIG. 4A illustrates a FGC start-up control sub-procedure of a foreground and background GC start-up control scheme of the method according to an embodiment of the present invention, where the FGC start-up control sub-procedure comprises the associate operations of the FGC procedure shown in FIG. 3A in a first phase.
Figure 4B:
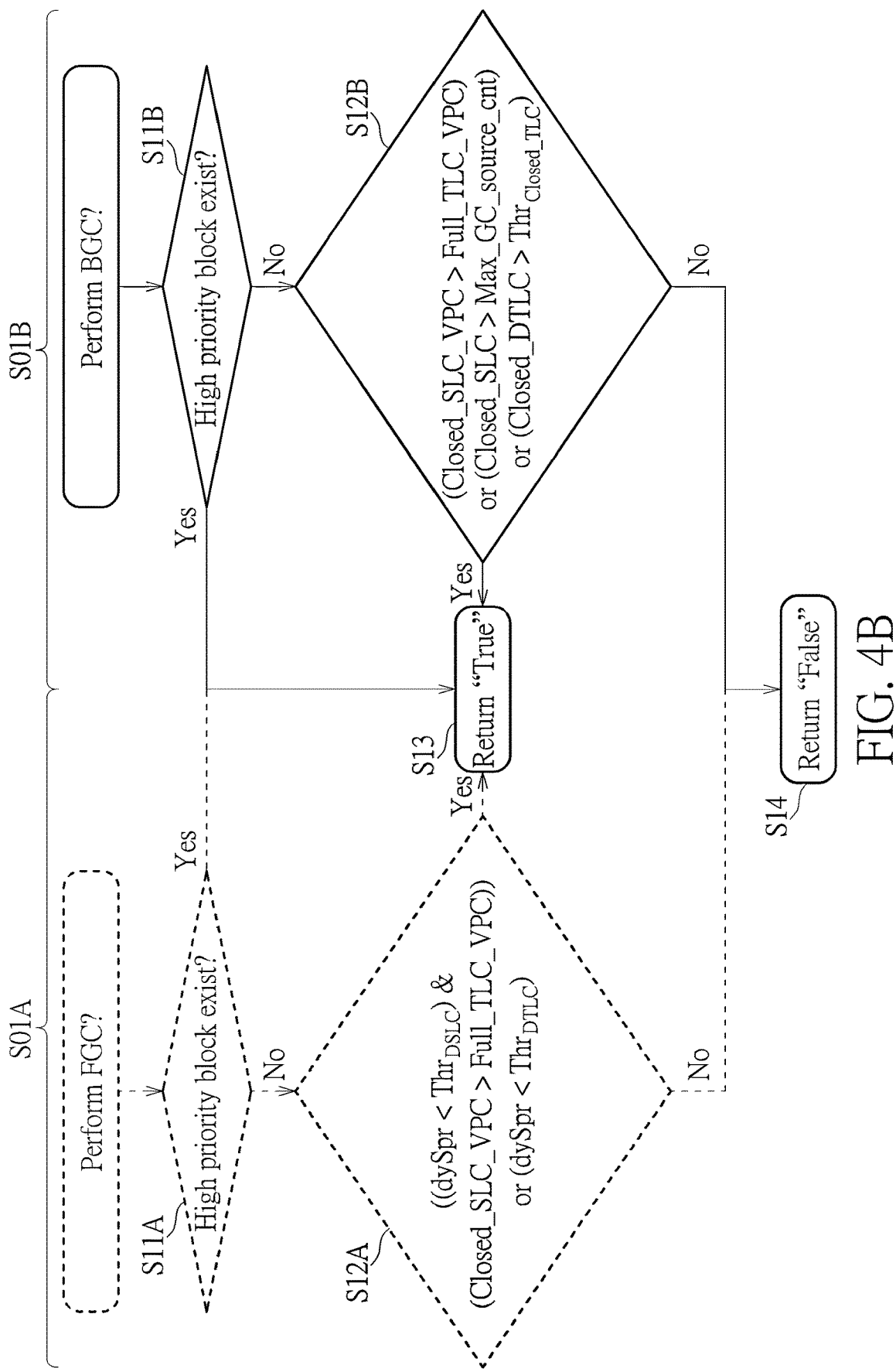
FIG. 4B illustrates a BGC start-up control sub-procedure of the foreground and background GC start-up control scheme, where the BGC start-up control sub-procedure comprises the associate operations of the BGC procedure shown in FIG. 3B in the first phase.

FIG. 4A and FIG. 4B illustrate a FGC start-up control sub-procedure and a BGC start-up control sub-procedure of a foreground and background GC start-up control scheme of the method according to an embodiment of the present invention, respectively, where the FGC start-up control sub-procedure comprises the associate operations of the FGC procedure shown in FIG. 3A in the phase PHASE(1), and the BGC start-up control sub-procedure comprises the associate operations of the BGC procedure shown in FIG. 3B in the phase PHASE(1).

As shown in FIG. 4A, the partial working flow depicted with solid lines may correspond to the FGC, while the partial working flow depicted with dashed lines may be temporarily ignored. The memory controller 110 may determine in Step S11A whether any high priority block exists according to the high priority block count H_pri_cnt. If Yes (e.g., H_pri_cnt>0), proceed to Step S13; if No (e.g., H_pri_cnt=0), proceed to Step S12A. The memory controller 110 may determine in Step S12A whether at least one first FGC-related condition in the set of first FGC-related conditions is satisfied. If Yes, proceed to Step S13; if No, proceed to Step S14. For example, the set of first FGC-related conditions may comprise:

(1) a first condition: $((dySpr<Thr_{DSLC})$ & $(Closed\_SLC\_VPC>Full\_TLC\_VPC))$; and (2) a second condition: $(dySpr<Thr_{DTLC})$;

wherein regarding starting the GC (e.g., the FGC), $Thr_{DSLC}$ may represent a first threshold for starting the GC (especially when the GC may be performed on the SLC block), to allow the memory controller 110 to start the GC when $(dySpr<Thr_{DSLC})$ (for example, when $(dySpr<Thr_{DSLC})$ and $(Closed\_SLC\_VPC>Full\_TLC\_VPC))$, and $Thr_{DTLC}$ may represent a second threshold for starting the GC (especially when the GC may not be performed on the SLC block), to allow the memory controller 110 to start the GC when $(dySpr<Thr_{DTLC})$, but the invention is not limited thereto. For example, the first condition may correspond to the GC in which the source block(s) are the SLC block(s) such as the DSLC block(s), and the second condition may correspond to the GC in which the source block(s) are the TLC block(s) such as the DTLC block(s). The dynamic area spare block count dySpr may decrease when the memory controller 110 writes data to the NV memory 120 in response to the aforementioned at least one first command, and the number of the spare blocks (e.g., the blocks that have not been used) in the dynamic area may become insufficient. The first threshold $Thr_{DSLC}$ may be greater than the second threshold $Thr_{DTLC}$, to allow the first condition to be satisfied first/preferentially while the dynamic area spare block count dySpr is decreasing. According to some viewpoints, the set of first FGC-related conditions may further comprise the condition(s) regarding whether any high priority block exists (e.g., H_pri_cnt>0). In addition, in Step S13, the memory controller 110 may return "True" to indicate the determination result "Yes" of Step S01A. In Step S14, the memory controller 110 may return "False" to indicate the determination result "No" of Step S01A.

As shown in FIG. 4B, the partial working flow depicted with solid lines may correspond to the BGC, while the partial working flow depicted with dashed lines may be temporarily ignored. The memory controller 110 may determine in Step S11B whether any high priority block exists according to the high priority block count H_pri_cnt. If Yes (e.g., H_pri_cnt>0), proceed to Step S13; if No (e.g., H_pri_cnt=0), proceed to Step S12B. The memory controller 110 may determine in Step S12B whether at least one first BGC-related condition in the set of first BGC-related conditions is satisfied. If Yes, proceed to Step S13; if No, proceed to Step S14. For example, the set of first BGC-related conditions may comprise:

(1) a third condition: (Closed_SLC_VPC>Full_TLC_VPC);
(2) a fourth condition: (Closed_SLC>Max_GC_source_cnt); and
(3) a fifth condition: (Closed_DTLC>$Thr_{Closed\_TLC}$);

wherein regarding starting the GC (e.g., the BGC), $Thr_{closed\_TLC}$ may represent a third threshold for starting the GC, to allow the memory controller 110 to start the GC when (Closed_TLC>$Thr_{Closed\_TLC}$), but the present invention is not limited thereto. According to some viewpoints, the set of first BGC-related conditions may further comprise the condition(s) regarding whether any high priority block exists (e.g., H_pri_cnt>0). In addition, in Step S13, the memory controller 110 may return "True" to indicate the determination result "Yes" of Step S01B. In Step S14, the memory controller 110 may return "False" to indicate the determination result "No" of Step S01B.

No matter whether the memory controller 110 is determining whether to perform the FGC or is determining whether to perform the BGC, the memory controller 110 may first determine whether there is any high priority block, as shown in FIG. 4A and FIG. 4B, and after obtaining the determination result "Yes" of any step among Steps S01A and S01B, obtain the GC mode (or the GC type) for determining the type of the source block(s) to be selected, as shown in FIG. 3A and FIG. 3B.

For better comprehension, the foreground and background GC start-up control scheme may be illustrated with the working flow shown in FIG. 4A and FIG. 4B, but the present invention is not limited thereto. According to some embodiments, one or more steps may be added, deleted, or changed in the working flow shown in FIG. 4A and FIG. 4B.

Figure 5A:
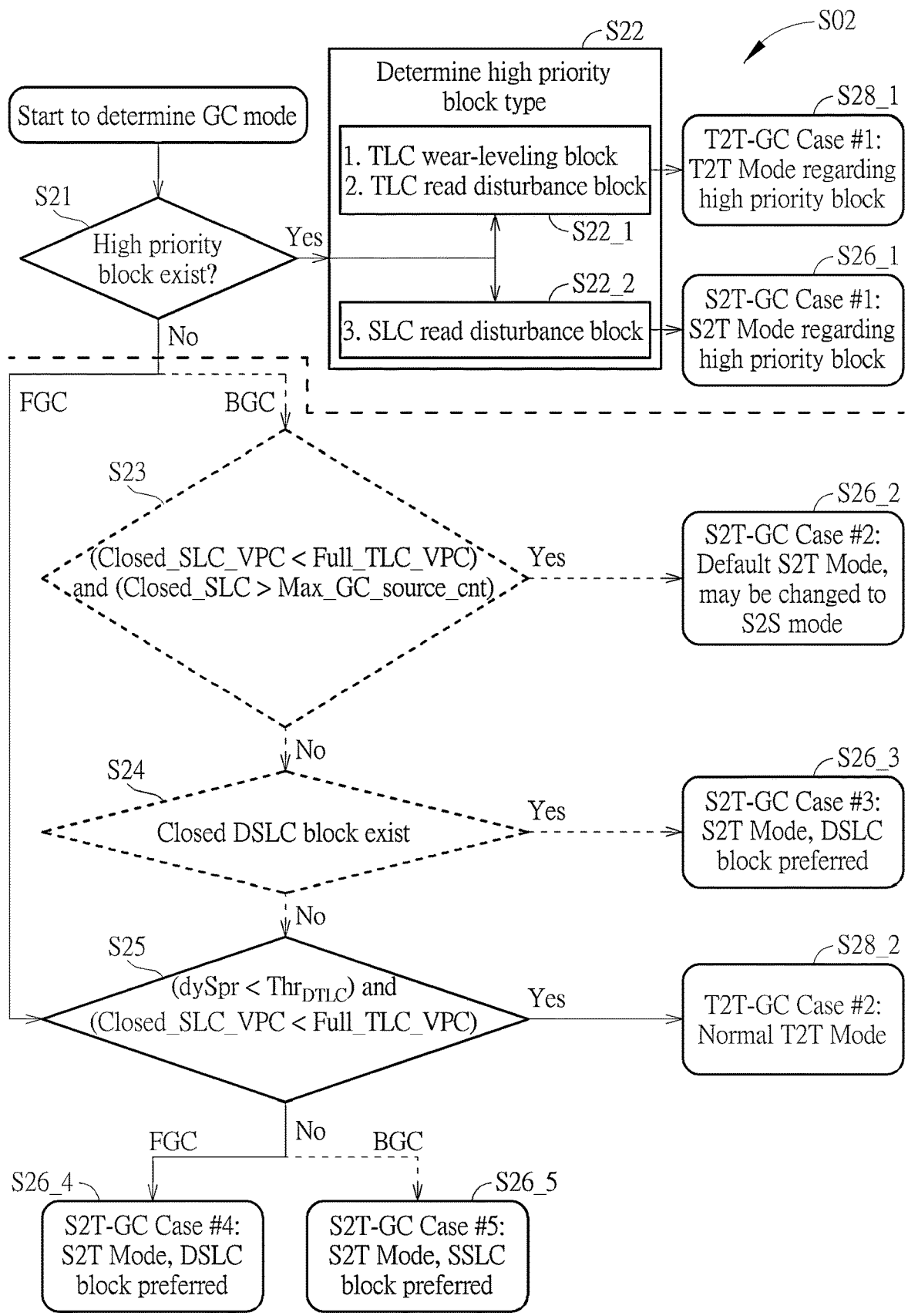
FIG. 5A illustrates a FGC type control sub-procedure of a foreground and background GC type control scheme of the method according to an embodiment of the present invention, where the FGC type control sub-procedure comprises the associate operations of the FGC procedure shown in FIG. 3A in a second phase.
Figure 5B:
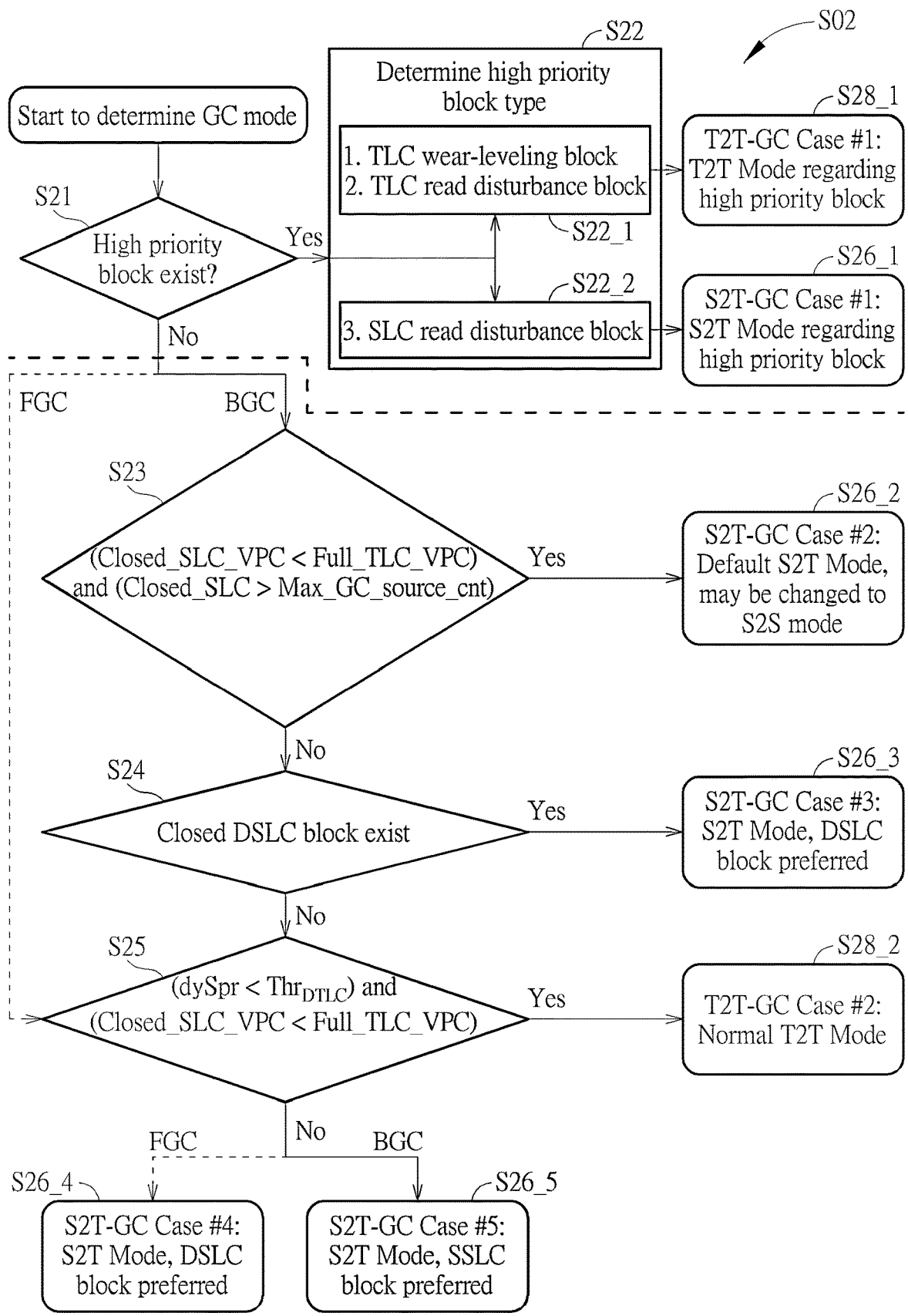
FIG. 5B illustrates a BGC type control sub-procedure of the foreground and background GC type control scheme, where the BGC type control sub-procedure comprises the associate operations of the BGC procedure shown in FIG. 3B in the second phase.

FIG. 5A and FIG. 5B illustrates a FGC type control sub-procedure and a BGC type control sub-procedure of a foreground and background GC type control scheme of the method according to an embodiment of the present invention, respectively, where the FGC type control sub-procedure comprises the associate operations of the FGC procedure shown in FIG. 3A in the phase PHASE(2), and the BGC type control sub-procedure comprises the associate operations of the BGC procedure shown in FIG. 3B in the phase PHASE(2).

As shown in FIG. 5A, the partial working flow depicted with solid lines may correspond to the FGC, while the partial working flow depicted with dashed lines may be temporarily ignored. When starting to determine the GC mode (or the GC type) regarding the FGC, the memory controller 110 may determine in Step S21 whether any high priority block exists according to the high priority block count H_pri_cnt. If Yes (e.g., H_pri_cnt>0), proceed to Step S22; if No (e.g., H_pri_cnt=0), proceed to Step S25. The memory controller 110 may determine in Step S25 whether at least one second FGC-related condition in the set of second FGC-related conditions is satisfied. If Yes, proceed to Step S28_2; if No, proceed to Step S26_4. For example, the set of second FGC-related conditions may comprise:

(1) a sixth condition: (dySpr<$Thr_{DTLC}$) and (Closed_SLC_VPC<Full_TLC_VPC);

but the present invention is not limited thereto. According to some viewpoints, the set of second FGC-related conditions may further comprise the condition(s) regarding whether any high priority block exists (e.g., H_pri_cnt>0). Regarding the FGC, as it is needed to focus on releasing the blocks (or their storage space) of the dynamic area, the memory controller 110 may directly jump to (or "go to") the last step among Steps S23 to S25, i.e., Step S25 (rather than executing at least one step among Steps S23 to S25, starting from Step S23) to determine whether the DSLC block or DTLC block needs to be released.

As shown in FIG. 5B, the partial working flow depicted with solid lines may correspond to the BGC, while the partial working flow depicted with dashed lines may be temporarily ignored. When starting to determine the GC mode (or the GC type) regarding the BGC, the memory controller 110 may determine in Step S21 whether there is any high priority block according to the high priority block count H_pri_cnt. If Yes (e.g., H_pri_cnt>0), proceed to Step S22; if No (e.g., H_pri_cnt=0), proceed to Step S23. The memory controller 110 may determine in at least one step (e.g., Step S23, or Steps S23 and S24, or Steps S23 to S25) among Steps S23 to S25 whether at least one second BGC-related condition in the set of second BGC-related conditions is satisfied, to selectively enter Step S26_2, Step S26_3, Step S28_2 or Step S26_5. For example, the set of second BGC-related conditions may comprise:

(1) a seventh condition: (Closed_SLC_VPC<Full_TLC_VPC) and (Closed_SLC>Max_GC_source_cnt);
(2) an eighth condition: there is at least one closed DSLC block; and
(3) the sixth condition: (dySpr<$Thr_{DTLC}$) and (Closed_SLC_VPC<Full_TLC_VPC);

but the present invention is not limited thereto. According to some viewpoints, the set of second BGC-related conditions may further comprise the condition(s) regarding whether any high priority block exists (e.g., H_pri_cnt>0). Regarding the BGC, the memory controller 110 may first release the SSLC blocks (or their storage space) of the static area. First, when there are too many SLC blocks (e.g., Closed_SLC>Max_GC_source_cnt) and Closed_SLC_VPC<Full_TLC_VPC, this means that there are too many SLC blocks with low valid page counts in the NV memory 120, so the memory controller 110 may clear (or erase) them via the BGC to release many blocks. Second, when there is the aforementioned at least one closed DSLC block or it is needed to clear the DTLC block(s) (e.g., dySpr<$Thr_{DTLC}$ and Closed_SLC_VPC<Full_TLC_VPC), the memory controller 110 may clear (or erase) them via the BGC, to assist the FGC in releasing the storage space of the dynamic area. If the first two second FGC-related conditions among the above three second FGC-related conditions are not satisfied, the memory controller 110 may clear the SSLC blocks through the BGC.

As shown in any figure among FIG. 5A and FIG. 5B, the memory controller 110 may determine at least one high priority block type in Step S22, and more particularly, determine whether a set of high-priority-related conditions are satisfied, to selectively enter Step S28_1 or Step S26_1. For example, the set of high-priority-related conditions may comprise:

(1) the above-mentioned any high priority block comprises at least one TLC wear-leveling block (e.g., a TLC block that needs to be processed with the wear-leveling processing), which may belong to a TLC wear-leveling block type (referred to as "Type #1" for brevity);

(2) the above-mentioned any high priority block comprises at least one TLC read disturbance block (e.g., a TLC block that needs to be processed with the read reclaim processing), which may belong to a TLC read disturbance block type (referred to as "Type #2" for brevity); and (3) the above-mentioned any high priority block comprises at least one SLC read disturbance block (e.g., an SLC block that needs to be processed with the read reclaim processing), which may belong to an SLC read disturbance block type (referred to as "Type #3" for brevity);

where the above-mentioned at least one high priority block type may comprise Types #1, #2, and #3, but the present invention is not limited thereto. According to some viewpoints, the set of second FGC-related conditions may further comprise the set of high-priority-related conditions, and the set of second BGC-related conditions may further comprise the set of high-priority-related conditions. In addition, Step S22 may comprise multiple sub-steps such as Steps S22_1 and S22_2. For example, the memory controller 110 may determine in Step S22_1 that the aforementioned at least one TLC wear-leveling block and/or the aforementioned at least one TLC read disturbance block exist, and execute Step S28_1 correspondingly. For another example, the memory controller 110 may determine in Step S22_2 that the aforementioned at least one SLC read disturbance block exists, and execute Step S26_1 correspondingly. Additionally, the operation descriptions of Steps S26_1 to S26_5, Step S28_1 and Step S28_2 may be described as follows.

In Step S26_1, the memory controller 110 may determine that the current case is the S2T-GC Case #1: the S2T Mode regarding the high priority block(s).

In Step S26_2, the memory controller 110 may determine that the current case is the S2T-GC Case #2: the Default S2T Mode, which may be changed to the S2S mode.

In Step S26_3, the memory controller 110 may determine that the current case is the S2T-GC Case #3: the S2T Mode, with the DSLC block(s) being preferred (or preferentially selected as the GC source blocks).

In Step S26_4, the memory controller 110 may determine that the current case is the S2T-GC Case #4: the S2T Mode, with the DSLC block(s) being preferred (or preferentially selected as the GC source blocks).

In Step S26_5, the memory controller 110 may determine that the current case is the S2T-GC Case #5: the S2T Mode, with the SSLC block(s) being preferred (or preferentially selected as the GC source blocks).

In Step S28_1, the memory controller 110 may determine that the current case is the T2T-GC Case #1: the T2T Mode regarding the high priority block(s).

In Step S28_2, the memory controller 110 may determine that the current case is the T2T-GC Case #2: the Normal T2T Mode.

For better comprehension, the foreground and background GC type control scheme may be illustrated with the working flow shown in FIG. 5A and FIG. 5B, but the present invention is not limited thereto. According to some embodiments, one or more steps may be added, deleted, or changed in the working flow shown in FIG. 5A and FIG. 5B.

Figure 6:
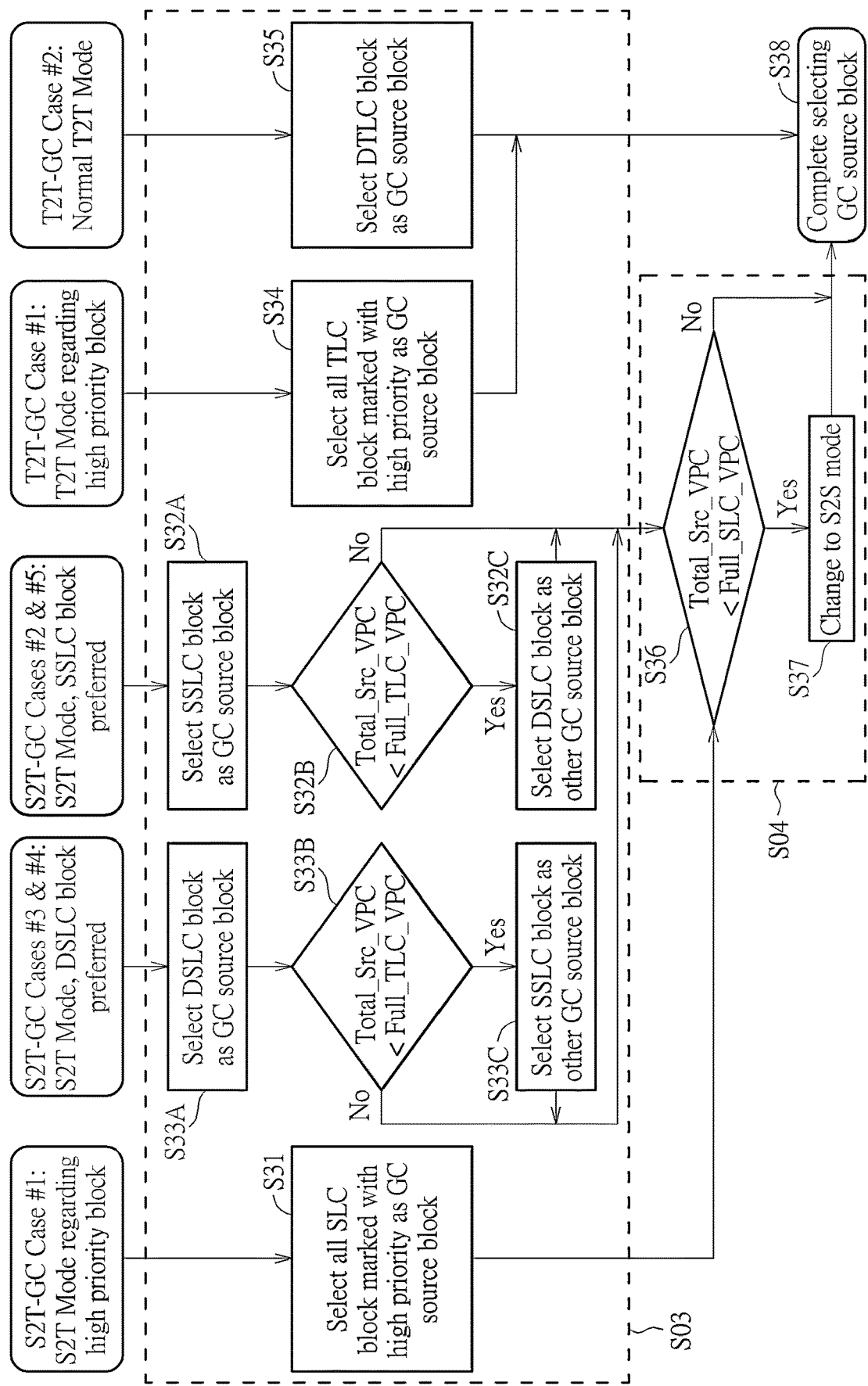
FIG. 6 illustrates a GC source selection control sub-procedure of a GC source selection control scheme of the method according to an embodiment of the present invention, where the GC source selection control sub-procedure comprises the associate operations of the FGC procedure and the BGC procedure respectively shown in FIG. 3A and FIG. 3B in a third phase.

FIG. 6 illustrates a GC source selection control sub-procedure of a GC source selection control scheme of the method according to an embodiment of the present invention, where the GC source selection control sub-procedure comprises the associate operations of the FGC procedure and the BGC procedure respectively shown in FIG. 3A and FIG. 3B in the phase PHASE(3). According to a certain case among the multiple cases shown in the uppermost part of FIG. 6, the memory controller 110 may execute a corresponding partial working flow, in order to select or pick up one or more blocks as the GC source blocks, for performing the GC.

In Step S31, the memory controller 110 may select all SLC blocks marked with high priority as the GC source blocks. For example, all SLC blocks marked with high priority may comprise the aforementioned at least one SLC read disturbance block such as the SLC block that needs to be processed with the read reclaim processing.

In Step S32A, the memory controller 110 may select one or more SSLC blocks as the GC source blocks.

In Step S32B, the memory controller 110 may determine whether the total source block valid page count Total_Src_VPC (e.g., the summation of the respective valid page counts {VPC} of the SSLC blocks just selected in Step S32A) is less than the maximum valid page count Full_TLC_VPC of one TLC block. If Yes, proceed to Step S32C; if No, proceed to Step S36.

In Step S32C, the memory controller 110 may select one or more DSLC blocks as other GC source blocks (or additional GC source blocks) to increase the total source block valid page count Total_Src_VPC, and more particularly, make Total_Src_VPC≥Full_TLC_VPC, but the present invention is not limited thereto.

In Step S33A, the memory controller 110 may select one or more DSLC blocks as the GC source blocks.

In Step S33B, the memory controller 110 may determine whether the total source block valid page count Total_Src_VPC (e.g., the summation of the respective valid page counts {VPC} of the DSLC blocks just selected in Step S33A) is less than the maximum valid page count Full_TLC_VPC of one TLC block. If Yes, proceed to Step S33C; if No, proceed to Step S36.

In Step S33C, the memory controller 110 may select one or more SSLC blocks as other GC source blocks (or additional GC source blocks) to increase the total source block valid page count Total_Src_VPC, and more particularly, make Total_Src_VPC≥Full_TLC_VPC, but the present invention is not limited thereto.

As shown in Steps S32B and S33B, after selecting the SLC block(s) in a certain area among the static area and the dynamic area as the GC source blocks, the memory controller 110 may determine whether to select the SLC block(s) in another area among the static area and the dynamic area as the GC source blocks according to whether the following condition is satisfied:

(1) the ninth condition: Total_Src_VPC<Full_TLC_VPC; where this condition may be regarded as a GC source block increasing condition.

In Step S34, the memory controller 110 may select all TLC blocks marked with high priority as the GC source blocks. For example, all TLC blocks marked with high priority may comprise the aforementioned at least one TLC wear-leveling block and/or the aforementioned at least one TLC read disturbance block such as the TLC block that needs to be processed with the read reclaim processing.

In Step S35, the memory controller 110 may select one or more DTLC blocks as the GC source blocks.

In Step S36, the memory controller 110 may determine whether the total source block valid page count Total_Src_VPC is less than the maximum valid page count Full_SLC_VPC of one SLC block. If Yes, proceed to Step S37; if No, proceed to Step S38. For example, the total source block valid page count Total_Src_VPC at this moment (the time point at which Step S36 is executed) may represent the summation of the respective valid page counts {VPC} of all SLC blocks marked with high priority that have just been selected in Step S31, or the summation of the respective valid page counts {VPC} of the SLC blocks (e.g., the SSLC blocks, or the SSLC blocks and the DSLC blocks) that have just been selected in the partial working flow starting from Step S32A, or the summation of the respective valid page counts {VPC} of the SLC blocks (e.g., the DSLC blocks, or the DSLC blocks and the SSLC blocks) that have just been selected in the partial working flow starting from Step S33A.

In Step S37, the memory controller 110 may change the target GC mode from the temporarily determined S2T mode to the S2S mode. For example, the memory controller 110 may determine in any step among Steps S26_1 to S26_5 in advance that the current case is the S2T-GC case (e.g., a certain case among the S2T-GC Cases #1 to #5) to temporarily determine the destination block to be the TLC block, and change this determination in Step S37, and more particularly, determine the destination block to be the SLC block. By performing the operation of Step S37, the memory controller 110 may prevent the valid page count VPC of the destination block after the completion of the GC operation from being too small, and more particularly, prevent the valid page count ratio RATIO_VPC of the destination block after the completion of the GC operation from being too low (e.g. RATIO_TLC_VPC<1/3, for the TLC block) and therefore quickly being selected as the GC source block of a subsequent GC operation. In an ideal situation, the memory controller 110 may set RATIO_VPC0=1 and control RATIO_VPC=RATIO_VPC0=1, but the invention is not limited thereto.

In Step S38, the memory controller 110 may complete selecting the GC source blocks.

Regarding any high-priority-related case (e.g., the S2T-GC Case #1 and the T2T-GC Case #1), the memory controller 110 does not need to detect whether Total_Src_VPC<Full_TLC_VPC as if it is in certain non-high-priority-related cases (e.g., the S2T-GC Cases #2 to #5), and more particularly, does not need to further select one or more blocks as other source blocks to increase the total source block valid page count Total_Src_VPC or make Total_Src_VPC≥Full_TLC_VPC. In addition, regarding the above-mentioned non-high-priority-related cases such as the S2T-GC Cases #2 to #5, the memory controller 110 may preferentially select one or more SLC blocks in a certain area among the static area and the dynamic area to be the GC source blocks, and when there is a need (e.g., when Total_Src_VPC<Full_TLC_VPC), try to select one or more SLC blocks in the other area among the static area and the dynamic area to be other GC source blocks, in order to try making Total_Src_VPC≥Full_TLC_VPC.

For better comprehension, the GC source selection control scheme may be illustrated with the working flow shown in FIG. 6, but the present invention is not limited thereto. According to some embodiments, one or more steps may be added, deleted, or changed in the working flow shown in FIG. 6.

As shown in FIG. 5A, FIG. 5B and FIG. 6, the memory controller 110 may determine or temporarily determine the target GC mode in the FGC type control sub-procedure or the BGC type control sub-procedure, and in any case among the S2T-GC Cases #1 to #5, selectively change the target GC mode from the temporarily determined S2T mode to the S2S mode. According to some viewpoints, the FGC type control sub-procedure and the BGC type control sub-procedure may also be referred to as the FGC mode control sub-procedure and the BGC mode control sub-procedure, respectively.

According to some embodiments, the above-mentioned GC-management-related information in the GC management table 120GC and/or the GC management table 116GC may comprise a plurality of parameters such as the closed SLC block count Closed_SLC, the closed SLC block valid page count Closed_SLC_VPC, the closed TLC block count Closed_TLC, the dynamic area spare block count dySpr, the high priority block count H_pri_cnt, etc., but the invention is not limited thereto. For example, the above-mentioned GC-management-related information may comprise all parameters shown in FIG. 4A, FIG. 4B, FIG. 5A, FIG. 5B and FIG. 6.

In the above embodiments, the above-mentioned DTLC block may be taken as an example of the above-mentioned DXLC block, where X=3, but the present invention is not limited thereto. According to some embodiments, the DTLC block may be replaced by the DXLC block, and the associated descriptions together with the associated parameters and the associated conditions such as the first condition, the second condition, etc. may vary correspondingly. More particularly, the second threshold $Thr_{DTLC}$ and the third threshold $Thr_{Closed\_TLC}$ may be replaced by the second threshold $Thr_{DXLC}$ and the third threshold $Thr_{Closed\_TLC}$ respectively, and the closed TLC block count Closed_TLC and the closed DTLC block count Closed_DTLC may be replaced by the closed XLC block count Closed_XLC and the closed DXLC block count Closed_DXLC, respectively, for indicating the number of the closed XLC/DXLC blocks in the dynamic area, and the maximum valid page count Full_TLC_VPC may be replaced by the maximum valid page count Full_XLC_VPC of one XLC block, where X>1. For example, Full_XLC_VPC=(X*Full_SLC_VPC). In addition, at least one portion of the FGC/BGC-related conditions may be rewritten as follows:

(1) the first condition: ((dySpr<$Thr_{DSLC}$) & (Closed_SLC_VPC>Full_XLC_VPC));
(2) the second condition: (dySpr<$Thr_{DXLC}$);
(3) the third condition: (Closed_SLC_VPC>Full_XLC_VPC);
(4) the fourth condition: (Closed_SLC>Max_GC_source_cnt);
(5) the fifth condition: (Closed_DXLC>$Thr_{Closed\_XLC}$);
(6) the sixth condition: (dySpr<$Thr_{DXLC}$) and (Closed_SLC_VPC<Full_XLC_VPC);
(7) the seventh condition: (Closed_SLC_VPC<Full_XLC_VPC) and (Closed_SLC>Max_GC_source_cnt);
(8) the eighth condition: there is at least one closed DSLC block; and (9) the ninth condition: Total_Src_VPC<Full_XLC_VPC; but the present invention is not limited thereto. For brevity, similar descriptions for these embodiments are not repeated in detail here.

Figure 7:
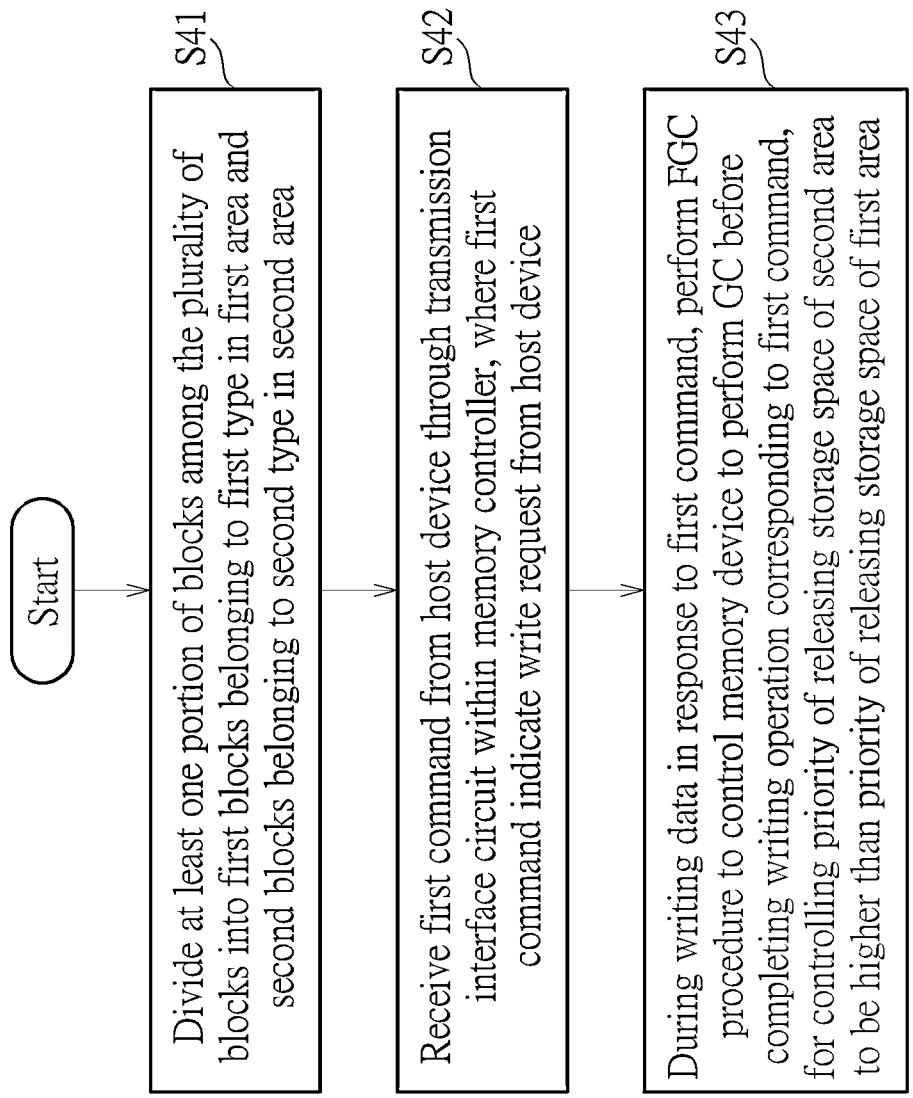
FIG. 7 illustrates a working flow of the method according to an embodiment of the present invention.

FIG. 7 illustrates a working flow of the method according to an embodiment of the present invention. The memory controller 110 may at least execute Steps S41 to S43, and more particularly, perform the operation of Step S43 to enhance the overall performance. For example, the memory controller 110 may operate according to one or more control schemes of the method, such as the foreground and background GC start-up control scheme, the foreground and background GC type control scheme and the GC source selection control scheme, where the DTLC blocks may be replaced by the DXLC blocks.

In Step S41, the memory controller 110 may divide the aforementioned at least one portion of blocks {BLK} among the plurality of blocks {BLK} into the multiple first blocks (e.g., the SSLC blocks) belonging to the aforementioned at least one first type in the first area (e.g., the static area) and the multiple second blocks (e.g., the DSLC blocks and the DTLC blocks) belonging to the aforementioned at least one second type in the second area (e.g., the dynamic area), where the bit count per memory cell of the multiple first blocks is fixed, and the bit count per memory cell of the first set of second blocks among the multiple second blocks, rather than the bit count per memory cell of all second blocks among the multiple second blocks, is fixed.

The bit count per memory cell of the multiple first blocks (e.g., the SSLC blocks) may be equal to a first predetermined value (e.g., 1), the bit count per memory cell of the first set of second blocks among the multiple second blocks (e.g., the DSLC blocks and the DXLC blocks such as the DTLC blocks) may be equal to a second predetermined value (e.g., the bit count per memory cell X (or "the per-memory-cell bit count X") of the DXLC blocks, where X>1), and the memory controller 110 may reconfigure any second block in a second set of second blocks among the multiple second blocks, to make the bit count per memory cell of the aforementioned any second block change between the first predetermined value and the second predetermined value, where both of the first predetermined value and the second predetermined value are positive integers, and the second predetermined value is greater than the first predetermined value. For example, the memory controller 110 may configure the starting address of the first area (e.g., the static area) to be a predetermined physical address Addr0, configure the starting address of the second area (e.g., the dynamic area) to be a predetermined physical address Addr1, and configure the starting address of the first set of second blocks to be a predetermined physical address Addr2, and Addr2>Addr1>Addr0, but the invention is not limited thereto.

In Step S42, the memory controller 110 may receive a first command from the host device 50 through the transmission interface circuit 118 within the memory controller 110, where the first command may indicate a write request from the host device 50. For example, the first command may represent the aforementioned any first command of the aforementioned at least one first command.

In Step S43, during writing data in response to the first command, the memory controller 110 may perform the FGC procedure to control the memory device 100 to perform the GC before completing the aforementioned at least one writing operation corresponding to the first command, for controlling the priority of releasing the storage space of the second area (e.g., the dynamic area) to be higher than the priority of releasing the storage space of the first area (e.g., the static area). More particularly, the memory controller 110 may determine whether the above-mentioned at least one first FGC-related condition is satisfied, and according to whether the above-mentioned at least one first FGC-related condition is satisfied, determine whether to perform the FGC. For example, if the above-mentioned at least one first FGC-related condition is satisfied, the memory controller 110 may determine to perform the FGC, to allow performing subsequent operations of the FGC procedure; otherwise, the memory controller 110 may determine not to perform the FGC, to prevent performing the above-mentioned subsequent operations of the FGC procedure. The parameters regarding the set of first FGC-related conditions may comprise a second area spare block count 2nd_area_Spr and the closed SLC block valid page count Closed_SLC_VPC, and the second area spare block count 2nd_area_Spr may replace the above-mentioned dynamic area spare block count dySpr, for indicating the number of spare blocks within the second area.

In addition, at least one portion of the FGC/BGC-related conditions may be rewritten as follows:
(1) the first condition: ((2nd_area_Spr<$Thr_{DSLC}$) & (Closed_SLC_VPC>Full_XLC_VPC));
(2) the second condition: (2nd_area_Spr<$Thr_{DXLC}$);
(3) the third condition: (Closed_SLC_VPC>Full_XLC_VPC);
(4) the fourth condition: (Closed_SLC>Max_GC_source_cnt);
(5) the fifth condition: (Closed_DXLC>$Thr_{Closed\_XLC}$);
(6) the sixth condition: (2nd_area_Spr<$Thr_{DXLC}$) and (Closed_SLC_VPC<Full_XLC_VPC);
(7) the seventh condition: (Closed_SLC_VPC<Full_XLC_VPC) and (Closed_SLC>Max_GC_source_cnt);
(8) the eighth condition: there is at least one closed DSLC block; and
(9) the ninth condition: Total_Src_VPC<Full_XLC_VPC; but the present invention is not limited thereto. For brevity, similar descriptions for this embodiment are not repeated in detail here.

For better comprehension, the method may be illustrated with the working flow shown in FIG. 7, but the present invention is not limited thereto. According to some embodiments, one or more steps may be added, deleted, or changed in the working flow shown in FIG. 7. For example, the memory controller 110 may perform the BGC procedure in response to the memory device 100 being in the idle state. More particularly, the memory controller 110 may determine whether the above-mentioned at least one first BGC-related condition is satisfied, and according to whether the above-mentioned at least one first BGC-related condition is satisfied, determine whether to perform the BGC based. If the above-mentioned at least one first BGC-related condition is satisfied, the memory controller 110 may determine to perform the BGC, to allow performing subsequent operations of the BGC procedure; otherwise, the memory controller 110 may determine not to perform the BGC, to prevent performing the above-mentioned subsequent operations of the BGC procedure. The parameters regarding the set of first BGC-related conditions may comprise the closed SLC block count Closed_SLC, the closed SLC block valid page count Closed_SLC_VPC and the closed XLC block count Closed_XLC, and the closed XLC block count Closed_XLC may indicate the number of the closed XLC blocks in the second area, where X is a positive integer and X>1.

When executing the FGC type control sub-procedure, the memory controller 110 may determine whether the above-mentioned at least one second FGC-related condition in the set of second FGC-related conditions is satisfied, and according to whether the above-mentioned at least one second FGC-related condition is satisfied, selectively determine that a GC mode regarding the FGC is a first predetermined mode (e.g., the Normal T2T Mode in the T2T-GC Case #2 mentioned in Step S28_2) or a second predetermined mode (e.g., the S2T Mode with the DSLC block(s) being preferred in the S2T-GC Case #4 mentioned in Step S26_4). The parameters regarding the set of second FGC-related conditions may comprise the second area spare block count 2nd_area_Spr and the closed SLC block valid page count Closed_SLC_VPC. More particularly, the second threshold $Thr_{DXLC}$ may represent a threshold for starting the FGC, to allow the memory controller 110 to determine the GC mode regarding the FGC to be the first predetermined mode rather than the second predetermined mode when the second area spare block count 2nd_area_Spr is less than the second threshold $Thr_{DXLC}$ and the closed SLC block valid page count Closed_SLC_VPC is less than the first maximum valid page count Full_XLC_VPC. For example, the maximum valid page count Full_XLC_VPC may represent, in a situation where any second block in the first set of second blocks is fully programmed and the data in the respective pages within this second block (i.e., the aforementioned any second block in the first set of second blocks) is valid data, a maximum value reached by the valid page count VPC of this second block.

In the first predetermined mode, one or more source blocks and at least one destination block of the FGC are XLC blocks in the second area, where X is a positive integer and X>1. In the second predetermined mode, the one or more source blocks and the aforementioned at least one destination block of the FGC are one or more SLC blocks and at least one XLC block, respectively. In addition, the memory controller 110 may temporarily determine that the GC mode regarding the FGC is the second predetermined mode when the sixth condition is not satisfied, and selectively change the GC mode regarding the FGC from the second predetermined mode to another predetermined mode (e.g., the S2S mode in Step S37) according to whether another condition (e.g., the condition "Total_Src_VPC<"Full_SLC_VPC" in Step S36) is satisfied. In the other predetermined mode (i.e., the aforementioned another predetermined mode), the one or more source blocks and the above-mentioned at least one destination block of the FGC are SLC blocks.

When executing the BGC type control sub-procedure, the memory controller 110 may determine whether the above-mentioned at least one second BGC-related condition in the set of second BGC-related conditions is satisfied, and according to whether the above-mentioned at least one second BGC-related condition is satisfied, selectively determine that a GC mode regarding the BGC is a third predetermined mode (e.g., the Default S2T Mode which may be changed to the S2S Mode in the S2T-GC Case #2 mentioned in Step S26_2), a fourth predetermined mode (e.g., the S2T Mode with the DSLC block(s) being preferred in the S2T-GC Case #3 mentioned in Step S26_3), the first predetermined mode (e.g., the Normal T2T Mode in the T2T-GC Case #2 mentioned in Step S28_2) or a fifth predetermined mode (e.g., the S2T Mode with the SSLC block(s) being preferred in the S2T-GC Case #5 mentioned in Step S26_5). The parameters regarding the set of second BGC-related conditions may comprise the second area spare block count 2nd_area_Spr and the closed SLC block valid page count Closed_SLC_VPC, and further comprise the closed SLC block count Closed_SLC.

Additionally, the memory controller 110 may configure the condition count of the set of second FGC-related conditions to be less than the condition count of the set of second BGC-related conditions, for controlling the priority of releasing storage space of the second area to be higher than that of releasing storage space of the first area. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing garbage collection (GC) management of a memory device with aid of block classification, the method being applied to a memory controller of the memory device, the memory device comprising the memory controller and a non-volatile (NV) memory, the NV memory comprising at least one NV memory element, the at least one NV memory element comprising a plurality of blocks, the method comprising:

utilizing the memory controller to divide at least one portion of blocks among the plurality of blocks into multiple first blocks belonging to at least one first type in a first area and multiple second blocks belonging to at least one second type in a second area, wherein a bit count per memory cell of the multiple first blocks is fixed, and a bit count per memory cell of a first set of second blocks among the multiple second blocks, rather than a bit count per memory cell of all second blocks among the multiple second blocks, is fixed;

utilizing the memory controller to receive a first command from a host device through a transmission interface circuit within the memory controller, wherein the first command indicates a write request from the host device; and during writing data in response to the first command, performing a foreground GC (FGC) procedure to control the memory device to perform GC before completing at least one writing operation corresponding to the first command, for controlling priority of releasing storage space of the second area to be higher than that of releasing storage space of the first area, wherein the FGC procedure comprises multiple FGC sub-procedures, and a FGC start-up control sub-procedure among the multiple FGC sub-procedures comprises:

determining whether at least one first FGC-related condition among a set of first FGC-related conditions is satisfied; and according to whether the at least one first FGC-related condition is satisfied, determining whether to perform FGC, wherein if the at least one first FGC-related condition is satisfied, it is determined to perform the FGC to allow performing subsequent operations of the FGC procedure, otherwise, it is determined not to perform the FGC to prevent performing said subsequent operations of the FGC procedure;

wherein the bit count per memory cell of the multiple first blocks is equal to a first predetermined value, the bit count per memory cell of the first set of second blocks among the multiple second blocks is equal to a second predetermined value, and the memory controller is arranged to reconfigure any second block in a second set of second blocks among the multiple second blocks, to make the bit count per memory cell of the any second block change between the first predetermined value and the second predetermined value, wherein both of the first predetermined value and the second predetermined value are positive integers, and the second predetermined value is greater than the first predetermined value.

2. The method of claim 1, wherein parameters regarding the set of first FGC-related conditions comprise a second area spare block count, for indicating a number of spare blocks within the second area, and a closed single level cell (SLC) block valid page count, for indicating a summation of respective valid page counts of closed SLC blocks; and the set of first FGC-related conditions comprise a first condition and a second condition, wherein:

the first condition represents that the second area spare block count is less than a first threshold and the closed SLC block valid page count is greater than a first maximum valid page count, wherein the first threshold represents a threshold for starting the FGC, to allow the memory controller to start the FGC when the second area spare block count is less than the first threshold and the closed SLC block valid page count is greater than the first maximum valid page count, and the first maximum valid page count represents, in a situation where any second block in the first set of second blocks is fully programmed and data in respective pages within the any second block in the first set of second blocks is valid data, a maximum value reached by a valid page count of the any second block in the first set of second blocks; and the second condition represents that the second area spare block count is less than a second threshold, wherein the second threshold represents another threshold for starting the FGC, to allow the memory controller to start the FGC when the second area spare block count is less than the second threshold.

3. The method of claim 2, wherein the first threshold is greater than the second threshold.

4. The method of claim 1, wherein the memory controller is arranged to perform a background GC (BGC) procedure in response to the memory device being in an idle state, wherein the BGC procedure comprises multiple BGC sub-procedures, and a BGC start-up control sub-procedure among the multiple BGC sub-procedures comprises:

determining whether at least one first BGC-related condition among a set of first BGC-related conditions is satisfied; and according to whether the at least one first BGC-related condition is satisfied, determining whether to perform BGC, wherein if the at least one first BGC-related condition is satisfied, it is determined to perform the BGC to allow performing subsequent operations of the BGC procedure, otherwise, it is determined not to perform the BGC to prevent performing said subsequent operations of the BGC procedure.

5. The method of claim 4, wherein parameters regarding the set of first BGC-related conditions comprise a closed single level cell (SLC) block count, for indicating a number of closed SLC blocks, a closed SLC block valid page count, for indicating a summation of respective valid page counts of closed SLC blocks, and a closed X-level cell (XLC) block count, for indicating a number of closed XLC blocks in the second area, wherein X is a positive integer and X>1; and the set of first BGC-related conditions comprise a third condition, a fourth condition and a fifth condition, wherein:

the third condition represents that the closed SLC block valid page count is greater than a first maximum valid page count, wherein the first maximum valid page count represents, in a situation where any second block in the first set of second blocks is fully programmed and data in respective pages within the any second block in the first set of second blocks is valid data, a maximum value reached by a valid page count of the any second block in the first set of second blocks;

the fourth condition represents that the closed SLC block count is greater than a predetermined GC source block maximum number, wherein the predetermined GC source block maximum number represents a maximum number of source blocks of a GC operation; and the fifth condition represents that the closed XLC block count is greater than a third threshold, wherein the third threshold represents a threshold for starting the BGC to allow the memory controller to start the BGC when the closed XLC block count is greater than the third threshold.

6. The method of claim 1, wherein in addition to the FGC start-up control sub-procedure, the multiple FGC sub-procedures further comprise a FGC type control sub-procedure; and the FGC type control sub-procedure comprises:

determining whether at least one second FGC-related condition among a set of second FGC-related conditions is satisfied; and according to whether the at least one second FGC-related condition is satisfied, selectively determining a GC mode regarding the FGC to be a first predetermined mode or a second predetermined mode.

7. The method of claim 6, wherein parameters regarding the set of second FGC-related conditions comprise a second area spare block count, for indicating a number of spare blocks within the second area, and a closed single level cell (SLC) block valid page count, for indicating a summation of respective valid page counts of closed SLC blocks; and the set of second FGC-related conditions comprise a sixth condition, wherein:

the sixth condition represents that the second area spare block count is less than a second threshold and the closed SLC block valid page count is less than a first maximum valid page count, wherein the second threshold represents a threshold for starting the FGC, to allow the memory controller to determine the GC mode regarding the FGC to be the first predetermined mode rather than the second predetermined mode when the second area spare block count is less than the second threshold and the closed SLC block valid page count is less than the first maximum valid page count, and the first maximum valid page count represents, in a situation where any second block in the first set of second blocks is fully programmed and data in respective pages within the any second block in the first set of second blocks is valid data, a maximum value reached by a valid page count of the any second block in the first set of second blocks.

8. The method of claim 7, wherein in the first predetermined mode, one or more source blocks and at least one destination block of the FGC are X-level cell (XLC) blocks in the second area, wherein X is a positive integer and X>1; and in the second predetermined mode, the one or more source blocks and the at least one destination block of the FGC are one or more single level cell (SLC) blocks and at least one XLC block, respectively.

9. The method of claim 7, wherein the memory controller is arranged to temporarily determine that the GC mode regarding the FGC is the second predetermined mode when the sixth condition is not satisfied, and selectively change the GC mode regarding the FGC from the second predetermined mode to another predetermined mode according to whether another condition is satisfied; and in said another predetermined mode, one or more source blocks and at least one destination block of the FGC are single level cell (SLC) blocks.

10. The method of claim 6, wherein the memory controller is arranged to perform a background GC (BGC) procedure in response to the memory device being in an idle state, wherein the BGC procedure comprises multiple BGC sub-procedures, and a BGC type control sub-procedure among the multiple BGC sub-procedures comprises:
determining whether at least one second BGC-related condition among a set of second BGC-related conditions is satisfied; and
according to whether the at least one second BGC-related condition is satisfied, selectively determining that a GC mode regarding the BGC is a third predetermined mode, a fourth predetermined mode, the first predetermined mode or a fifth predetermined mode.

11. The method of claim 10, wherein the memory controller is arranged to configure a condition count of the set of second FGC-related conditions to be less than a condition count of the set of second BGC-related conditions, for controlling priority of releasing storage space of the second area to be higher than that of releasing storage space of the first area.

12. A memory controller of a memory device, the memory device comprising the memory controller and a non-volatile (NV) memory, the NV memory comprising at least one NV memory element, the at least one NV memory element comprising a plurality of blocks, the memory controller comprising:
a processing circuit, arranged to control the memory controller according to a plurality of host commands from a host device, to allow the host device to access the NV memory through the memory controller, wherein the processing circuit is arranged to perform garbage collection (GC) management of the memory device with aid of block classification; and
a transmission interface circuit, arranged to perform communications with the host device;
wherein:
the memory controller divides at least one portion of blocks among the plurality of blocks into multiple first blocks belonging to at least one first type in a first area and multiple second blocks belonging to at least one second type in a second area, wherein a bit count per memory cell of the multiple first blocks is fixed, and a bit count per memory cell of a first set of second blocks among the multiple second blocks, rather than a bit count per memory cell of all second blocks among the multiple second blocks, is fixed;
the memory controller receives a first command from the host device through the transmission interface circuit within the memory controller, wherein the first command indicates a write request from the host device; and
during writing data in response to the first command, the memory controller performs a foreground GC (FGC) procedure to control the memory device to perform GC before completing at least one writing operation corresponding to the first command, for controlling priority of releasing storage space of the second area to be higher than that of releasing storage space of the first area, wherein the FGC procedure comprises multiple FGC sub-procedures, and a FGC start-up control sub-procedure among the multiple FGC sub-procedures comprises:
determining whether at least one first FGC-related condition among a set of first FGC-related conditions is satisfied; and
according to whether the at least one first FGC-related condition is satisfied, determining whether to perform FGC, wherein if the at least one first FGC-related condition is satisfied, it is determined to perform the FGC to allow performing subsequent operations of the FGC procedure, otherwise, it is determined not to perform the FGC to prevent performing said subsequent operations of the FGC procedure;
wherein the bit count per memory cell of the multiple first blocks is equal to a first predetermined value, the bit count per memory cell of the first set of second blocks among the multiple second blocks is equal to a second predetermined value, and the memory controller is arranged to reconfigure any second block in a second set of second blocks among the multiple second blocks, to make the bit count per memory cell of the any second block change between the first predetermined value and the second predetermined value, wherein both of the first predetermined value and the second predetermined value are positive integers, and the second predetermined value is greater than the first predetermined value.

13. The memory device comprising the memory controller of claim 12,
wherein the memory device comprises:
the NV memory, configured to store information; and
the memory controller, coupled to the NV memory, configured to control operations of the memory device.

14. An electronic device comprising the memory device of claim 13, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

* * * * *